(12) United States Patent
Blais et al.

(10) Patent No.: US 12,533,303 B2
(45) Date of Patent: Jan. 27, 2026

(54) COMPOSITION FOR THE SIMULTANEOUS BLEACHING AND DYEING OF KERATIN FIBRES AND PROCESS USING THIS COMPOSITION

(71) Applicant: L'Oreal, Paris (FR)

(72) Inventors: Stéphane Blais, Aulnay-sous-Bois (FR); Stéphane Sabelle, Aulnay-sous-Bois (FR); Rahma Benni, Aulnay-sous-Bois (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 18/267,209

(22) PCT Filed: Dec. 16, 2021

(86) PCT No.: PCT/EP2021/086227
§ 371 (c)(1),
(2) Date: Jun. 14, 2023

(87) PCT Pub. No.: WO2022/129347
PCT Pub. Date: Jun. 23, 2022

(65) Prior Publication Data
US 2024/0082122 A1    Mar. 14, 2024

(30) Foreign Application Priority Data

Dec. 18, 2020   (FR) ........................ 2013728

(51) Int. Cl.
| | |
|---|---|
| *A61Q 5/00* | (2006.01) |
| *A61K 8/22* | (2006.01) |
| *A61K 8/25* | (2006.01) |
| *A61K 8/41* | (2006.01) |
| *A61Q 5/08* | (2006.01) |
| *A61Q 5/10* | (2006.01) |

(52) U.S. Cl.
CPC ............... *A61K 8/22* (2013.01); *A61K 8/25* (2013.01); *A61K 8/411* (2013.01); *A61Q 5/08* (2013.01); *A61Q 5/10* (2013.01); *A61K 2800/882* (2013.01)

(58) Field of Classification Search
CPC . A61K 8/22; A61K 8/25; A61K 8/411; A61K 2800/882; A61K 8/19; A61K 8/347; A61Q 5/08; A61Q 5/10; A61Q 5/065
USPC ............................................. 8/405
See application file for complete search history.

(56) References Cited

U.S. PATENT DOCUMENTS

| | | |
|---|---|---|
| 3,100,739 A | 8/1963 | Kaiser et al. |
| 3,376,110 A | 4/1968 | Shiraeff |
| 3,524,842 A | 8/1970 | Grossmann et al. |
| 3,578,386 A | 5/1971 | Kalopissis et al. |
| 3,617,163 A | 11/1971 | Kalopissis et al. |
| 3,817,698 A | 6/1974 | Kalopissis et al. |
| 3,869,454 A | 3/1975 | Lang et al. |
| 3,955,918 A | 5/1976 | Lang |
| 4,003,699 A | 1/1977 | Rose et al. |
| 4,025,301 A | 5/1977 | Lang |
| RE30,199 E | 1/1980 | Rose et al. |
| 4,886,517 A | 12/1989 | Bugaut et al. |
| 5,008,093 A | 4/1991 | Merianos |
| 5,183,901 A | 2/1993 | Login et al. |
| 5,380,340 A | 1/1995 | Neunhoeffer et al. |
| 5,534,267 A | 7/1996 | Neunhoeffer et al. |
| 5,663,366 A | 9/1997 | Neunhoeffer et al. |
| 5,708,151 A | 1/1998 | Möckli |
| 5,766,576 A | 6/1998 | Löwe et al. |
| 5,879,413 A | 3/1999 | Pengilly et al. |
| 5,888,252 A | 3/1999 | Möckli |
| 5,919,273 A | 7/1999 | Rondeau et al. |
| 5,944,360 A | 8/1999 | Crapart |
| 5,993,490 A | 11/1999 | Rondeau et al. |
| 6,045,591 A | 4/2000 | Deneulenaere |
| 6,099,592 A | 8/2000 | Vidal et al. |
| 6,136,042 A | 10/2000 | Maubru |
| 6,179,881 B1 | 1/2001 | Henrion et al. |
| 6,284,003 B1 | 9/2001 | Rose et al. |
| 6,451,069 B2 | 9/2002 | Matsunaga et al. |
| 6,458,167 B1 | 10/2002 | Genet et al. |
| 6,730,789 B1 | 5/2004 | Birault et al. |
| 6,797,013 B1 | 9/2004 | Lang et al. |
| 6,863,883 B1 | 3/2005 | Tsujino et al. |
| 7,833,290 B2 * | 11/2010 | Guerin ............... A61K 8/19 8/405 |
| 7,857,865 B2 * | 12/2010 | Guerin ............... A61K 8/347 8/405 |

(Continued)

FOREIGN PATENT DOCUMENTS

| | | |
|---|---|---|
| DE | 2359399 A1 | 5/1975 |
| DE | 2527638 A1 | 5/1976 |

(Continued)

OTHER PUBLICATIONS

International Search Report and Written Opinion for counterpart Application No. PCT/EP2021/086226, dated Apr. 8, 2022.

(Continued)

*Primary Examiner* — Eisa B Elhilo

(74) *Attorney, Agent, or Firm* — The Marbury Law Group, PLLC

(57) ABSTRACT

The present invention relates to a composition for the simultaneous bleaching and dyeing of keratin fibres, comprising at least one chemical oxidizing agent, at least one (bi)carbonate, at least one silicate and at least one oxidation dye, and also to a process for the simultaneous bleaching and dyeing of keratin fibres using this composition.

20 Claims, No Drawings

(56) References Cited

U.S. PATENT DOCUMENTS

| | | | |
|---|---|---|---|
| 2009/0084395 | A1 | 4/2009 | Glenn, Jr. et al. |
| 2010/0154137 | A1 | 6/2010 | Hercouet et al. |
| 2016/0317413 | A1* | 11/2016 | Lalleman ............... A61K 8/22 |
| 2017/0333324 | A1* | 11/2017 | Lalleman ............... A61K 8/498 |
| 2017/0340549 | A1 | 11/2017 | Anderheggen et al. |
| 2020/0214942 | A1 | 7/2020 | Haruki et al. |

FOREIGN PATENT DOCUMENTS

| | | | |
|---|---|---|---|
| DE | 2538363 | A1 | 5/1976 |
| DE | 4133957 | A1 | 4/1993 |
| DE | 4137005 | A1 | 5/1993 |
| DE | 4220388 | A1 | 12/1993 |
| DE | 19543988 | A1 | 5/1997 |
| EP | 0714954 | A2 | 6/1996 |
| EP | 0770375 | A1 | 5/1997 |
| EP | 0850636 | A1 | 7/1998 |
| EP | 0850637 | A1 | 7/1998 |
| EP | 0860636 | A1 | 8/1998 |
| EP | 0918053 | A1 | 5/1999 |
| EP | 0920856 | A1 | 6/1999 |
| EP | 1062940 | A1 | 12/2000 |
| EP | 1133975 | A2 | 9/2001 |
| EP | 1133976 | A2 | 9/2001 |
| EP | 2191812 | A1 | 6/2010 |
| EP | 2702894 | A1 | 3/2014 |
| EP | 2723306 | B1 * | 12/2016 ............... A61Q 5/10 |
| FR | 1567219 | A | 5/1959 |
| FR | 1221122 | A | 5/1960 |
| FR | 1516943 | A | 2/1968 |
| FR | 1540423 | A | 9/1968 |
| FR | 1560664 | A | 3/1969 |
| FR | 2189006 | A1 | 1/1974 |
| FR | 2275462 | A1 | 1/1976 |
| FR | 2285851 | A1 | 4/1976 |
| FR | 2570946 | A1 | 4/1986 |
| FR | 2733749 | A1 | 11/1996 |
| FR | 2757385 | A1 | 6/1998 |
| FR | 2788433 | A1 | 7/2000 |
| FR | 2801308 | A1 | 5/2001 |
| FR | 2886136 | A1 | 12/2006 |
| GB | 738585 | A | 10/1955 |
| GB | 1026978 | A | 4/1966 |
| GB | 1153196 | A | 5/1969 |
| GB | 1163385 | A | 9/1969 |
| GB | 1195386 | A | 6/1970 |
| GB | 1514466 | A | 6/1978 |
| JP | 02-019576 | A | 1/1990 |
| JP | H04247016 | A | 9/1992 |
| JP | 05-163124 | A | 6/1993 |
| JP | H11246370 | A | 9/1999 |
| JP | 2002338444 | A | 11/2002 |
| JP | 2010143915 | A | 7/2010 |
| JP | 2010527732 | A | 8/2010 |
| JP | 2012236016 | A | 12/2012 |
| JP | 2013-213072 | A | 10/2013 |
| JP | 2019055941 | A | 4/2019 |
| WO | 94/08969 | A1 | 4/1994 |
| WO | 94/08970 | A1 | 4/1994 |
| WO | 95/01772 | A1 | 1/1995 |
| WO | 95/15144 | A1 | 6/1995 |
| WO | 96/15765 | A1 | 5/1996 |
| WO | 97/44004 | A1 | 11/1997 |
| WO | 99/48465 | A1 | 9/1999 |
| WO | 01/66646 | A1 | 9/2001 |
| WO | 03/029359 | A1 | 4/2003 |
| WO | 2008/152570 | A1 | 12/2008 |
| WO | WO 2015086677 | A1 * | 6/2015 ............... A61Q 5/10 |
| WO | 2016/091814 | A1 | 6/2016 |
| WO | 2020020710 | A1 | 1/2020 |
| WO | 2022/129347 | A1 | 6/2022 |

OTHER PUBLICATIONS

International Search Report and Written Opinion for counterpart Application No. PCT/EP2021/086227, dated Apr. 19, 2022.

Mintel: "Londacolor Color Creme," Londa, Record ID 232927, XP055847971, Oct. 13, 2023.

Mintel: "Hair Colour," Londa, Record ID 574739, XP055847972, Aug. 23, 2006.

Alberti, G. et al., "Ricerche Sui Coloranti Cationici Per Fibra Acrilica," La Chimica E L'Industria, (Milan), (Sep. 1974), vol. 56, No. 9, pp. 600-603 (English translation unavailable).

Alberti, Guido et al., "Cationic Dyes Derived from Several Heterocyclic Amines with Two or More Heteroatoms," Annali di Chimica, (Rome), (1975), 65(5-6), pp. 305-314.

Albert, Guido et al., "Thermodynamic Features in Acrylic Fiber Dyeing with Basic Dyes," Textile Research Journal, (Feb. 1984), 54(2), pp. 105-107.

Balaban, Alexandru et al., "Reactions of Pyrylium Salts with Nucleophiles," Revue Roumaine de Chimie, (1998), 33(4), pp. 377-383.

Prostakov, N.S. et al., "2,5-Dimethyl-4-Nitroaryl (Aminoaryl) Pyridines in Synthesis," Chemistry and Chemical Technology, published by Ivanovo Chemical Technological Institute, vol. 22, No. 5, pp. 548-553 (no translation available).

Kuznetsova et al., "The determination of Thickness of a Histological Section by Interference Microscopy," Tsitologiya, vol. 10, No. 3, (1968), pp. 403-405.

Yen, Feng-Wen et al., "The Design and Synthesis of Bisazo Series Compound Used in Organophotoconductor," MRL Bull. Res. Dev., vol. 6, No. 2 (1992), pp. 21-27.

Neidlein, Richard et al., "Synthese von Substituierten Pyridiniumsalzen," German Monatshefte für Chemie, (1975), vol. 106, No. 3, pp. 643-648 (English translation unavailable).

Savarino et al., "Disperse and Cationic Dyes from Aminophenyl-X-Azolo-Pyridines," Dhes and Pigments, vol. 11, (1989), pp. 163-172.

Seidler, Von Eberhard et al., "Die Eignung Verschiedener Ditetrazoliumsalze als Reduktionsindikatoren in der Enzymhistochemie," Acta histochem. Bd. 61 (1), 1978, pp. 48-52. (The qualification of different diterazolium salts as indicators in the oxido-reductase histochemistry).

Stashkevich, et al., The Journal of General Chemistry of the USSR (translated from Russian), vol. 40(1), pp. 178-183 (English translation of Zh. Obshch. Khim., vol. 40(1), (1970), pp. 195-202.

Tien, Hsien-Ju et al., "Syntheses of New Azo Dyestuff Containing a Sydnone Ring," Journal of the Chinese Chemical Society, (Taipei), (1998), 45(1), pp. 209-211.

Viscardi, Guido et al., "Disperse Cationic Azo Dyes from Heterocyclic Intermidiates," Dyes and Pigments, vol. 19, No. 1, (1992), pp. 69-79.

Zhousheng, Y., "Research and Application of the Coordination Reaction of New Fluorescent Reagent CCPAR and CU (II)," Lihua_Jianyan_Huaxue_Fence_vol._29_No._4_1993_pp._233-4.

Notice of Reasons for Refusal in JP2023537141, dated Jul. 16, 2024, 6 pages.

Notice of Reasons for Refusal in JP2023537144, dated Jul. 29, 2024, 12 pages.

* cited by examiner

COMPOSITION FOR THE SIMULTANEOUS BLEACHING AND DYEING OF KERATIN FIBRES AND PROCESS USING THIS COMPOSITION

CROSS REFERENCE TO RELATED APPLICATIONS

This is a National Stage Application of PCT/EP2021/086227, filed internationally on Dec. 16, 2021, which claims priority to French Application No. 2013728, filed on Dec. 18, 2020, both of which are incorporated by reference herein in their entireties.

TECHNICAL FIELD OF THE INVENTION

The present invention relates to a composition for the simultaneous bleaching and dyeing of keratin fibres, comprising at least one chemical oxidizing agent, at least one (bi)carbonate, at least one silicate and at least one oxidation dye, and also to a process for the simultaneous bleaching and dyeing of keratin fibres using this composition.

BACKGROUND OF THE INVENTION

When a person wishes to radically change hair colour, notably when he or she wishes to obtain a lighter colour than their original colour, it is often necessary to perform bleaching and then dyeing of the hair. Several methods exist for doing this.

The first method consists in using lightening products based on aqueous ammonia and hydrogen peroxide. These products may optionally contain dyes, which makes it possible simultaneously to lighten and dye the hair. However, the lightening performance results of these products remain limited, more particularly for applications to natural and/or dyed dark-coloured hair.

The second method consists in applying to the hair, in a first stage, lightening compositions based on peroxygenated salts, such as persulfates, and on alkaline agents, to which compositions hydrogen peroxide has been added at the time of use, in order to obtain greater lightening. However, these bleaching treatments, which are generally accompanied by the appearance of unaesthetic orange-yellow tints, are generally not chemically compatible with the presence of oxidation dyes to be able to bleach the hair fibre and dye it at the same time. It is thus necessary in this case to add an additional oxidation dyeing step. This two-step process is not satisfactory since, in addition to giving rise to numerous handling procedures, it has the drawback of being relatively long and can result in greater degradation of the quality of the fibre.

Thus, there is a real need to develop a composition for the simultaneous bleaching and dyeing of keratin fibres, comprising oxidation dyes, the composition having both good lightening properties and good dyeing properties, particularly when it is applied to dark-coloured hair, and making it possible notably to obtain a broader colour range, notably including pastel colours and chromatic colours. Furthermore, such a composition can comprise a wide range of oxidation dyes so as to cover all the shades desired by the user. Finally, such a composition can be used in a process for the simultaneous bleaching and dyeing of keratin fibres in a single step. Such a composition should also be more respectful of the quality of the fibres.

The Applicant has discovered, surprisingly, that all of these objectives can be achieved by means of the composition according to the present invention.

SUMMARY OF THE INVENTION

According to a first aspect, a subject of the present invention is a composition comprising:
  i) one or more chemical oxidizing agents chosen from hydrogen peroxide, hydrogen peroxide-generating systems other than peroxygenated salts, and mixtures thereof;
  ii) one or more compounds chosen from carbonates, carbonate-generating systems, bicarbonates, bicarbonate-generating systems and mixtures thereof;
  iii) one or more silicates;
  iv) one or more oxidation dyes;
  wherein the silicate(s) are present in a total content ranging from 3% to 35% by weight relative to the total weight of the composition.

According to a second aspect, a subject of the present invention is a process for the simultaneous bleaching and dyeing of keratin fibres, comprising the application to the keratin fibres of a composition as defined previously.

According to a third aspect, a subject of the present invention is the use of a composition as defined previously for the simultaneous bleaching and dyeing of keratin fibres.

According to a fourth aspect, a subject of the present invention is a multi-compartment device (kit) comprising:
  a first compartment containing a composition (A) comprising i) one or more chemical oxidizing agents chosen from hydrogen peroxide, hydrogen peroxide-generating systems other than peroxygenated salts and mixtures thereof; and
  a second compartment containing a composition (B1) comprising:
  ii) one or more compounds chosen from carbonates, carbonate-generating systems, bicarbonates, bicarbonate-generating systems and mixtures thereof; and
  iii) one or more silicates; and
  iv) one or more oxidation dyes;
  or
  a first compartment containing a composition (A) comprising i) one or more chemical oxidizing agents chosen from hydrogen peroxide, hydrogen peroxide-generating systems other than peroxygenated salts and mixtures thereof; and
  a second compartment containing a composition (B2) comprising:
  ii) one or more compounds chosen from carbonates, carbonate-generating systems, bicarbonates, bicarbonate-generating systems and mixtures thereof; and
  iii) one or more silicates; and
  a third compartment containing a composition (C) comprising iv) one or more oxidation dyes.

DETAILED DESCRIPTION OF THE INVENTION

For the purposes of the present invention and unless otherwise indicated:
  the term "keratin fibres" means fibres of human or animal origin, such as head hair, bodily hair, the eyelashes, the eyebrows, wool, angora, cashmere or fur. According to the present invention, the keratin fibres are preferably human keratin fibres, more preferentially the hair, even more preferentially the head hair;

the term "alkyl group" means a linear or branched, saturated hydrocarbon-based radical;

the term "$(C_x\text{-}C_y)$alkyl group" means an alkyl group comprising from x to y carbon atoms;

the term "silicate" means a silicic acid salt;

the term "oxidation dye" means an oxidation dye precursor chosen from oxidation bases and couplers. Oxidation bases and couplers are colourless or sparingly coloured compounds, which, via a condensation reaction in the presence of an oxidizing agent, give a coloured species;

the term "direct dye" means a natural and/or synthetic dye, including in the form of an extract or extracts, other than oxidation dyes. These are coloured compounds that will spread superficially on the fibre. They may be ionic or nonionic, i.e. anionic, cationic, neutral or nonionic;

the term "chemical oxidizing agent" means an oxidizing agent other than atmospheric oxygen;

the term "(bi)carbonate" means a carbonate or a bicarbonate.

Unless otherwise indicated, when compounds are mentioned in the present patent application, this also includes the optical isomers thereof, the geometrical isomers thereof, the tautomers thereof, the salts thereof or the solvates thereof such as hydrates, and mixtures thereof.

The terms "at least one" and "one or more" are synonymous and may be used interchangeably.

The terms "lightening" and "bleaching" are synonymous and may be used interchangeably.

Composition

According to a first aspect, a subject of the present invention is a composition as defined previously.

The Applicant has found, surprisingly, that the composition according to the present invention makes it possible to stabilize the oxidation dye(s) and to obtain a satisfactory level of lightening and also build-up of the colouring making it possible notably to achieve pastel or chromatic colours.

Moreover, the composition according to the invention is more respectful of the quality of the fibres, notably minimizing their degradation.

According to a preferred embodiment, the composition according to the invention comprises:
i) hydrogen peroxide;
ii) one or more compounds chosen from carbonates, bicarbonates and mixtures thereof;
iii) one or more silicates;
iv) one or more oxidation dyes;
wherein the silicate(s) are present in a total content ranging from 3% to 35% by weight relative to the total weight of the composition.

Chemical Oxidizing Agents

The composition according to the invention comprises i) one or more chemical oxidizing agents chosen from hydrogen peroxide, hydrogen peroxide-generating systems other than peroxygenated salts and mixtures thereof.

The hydrogen peroxide-generating systems other than peroxygenated salts may be chosen from urea peroxide, polymeric complexes that can release hydrogen peroxide, oxidases, and mixtures thereof.

As examples of polymeric complexes that can release hydrogen peroxide, mention may be made of polyvinylpyrrolidone/$H_2O_2$ in particular in powder form, and the other polymeric complexes described in U.S. Pat. Nos. 5,008,093, 3,376,110 and 5,183,901.

Oxidases can produce hydrogen peroxide in the presence of a suitable substrate, for instance glucose in the case of glucose oxidase or uric acid with uricase.

According to a particular embodiment, hydrogen peroxide and/or the hydrogen peroxide-generating system(s) other than peroxygenated salts may be added to the composition according to the invention just before it is applied to the keratin fibres. The intermediate composition(s) comprising hydrogen peroxide and/or hydrogen peroxide-generating system(s) other than peroxygenated salts may be referred to as oxidizing compositions and may also include various additional compounds or various adjuvants conventionally used in compositions for dyeing keratin fibres.

According to a preferred embodiment, the composition according to the invention comprises hydrogen peroxide chemical oxidizing agent.

The chemical oxidizing agent(s) are preferably present in a total content ranging from 1% to 12% by weight, more preferentially ranging from 3% to 9% by weight and even more preferentially ranging from 3.5% to 8.5% by weight, relative to the total weight of the composition.

According to a preferred embodiment, the hydrogen peroxide is present in a total content ranging from 1% to 12% by weight, preferably ranging from 3% to 9% by weight, more preferentially ranging from 3.5% to 8.5% by weight, relative to the total weight of the composition.

(Bi)Carbonates and/or (Bi)Carbonate-Generating Systems

The composition according to the invention also comprises ii) one or more compounds chosen from carbonates, carbonate-generating systems, bicarbonates, bicarbonate-generating systems and mixtures thereof.

According to a preferred embodiment, the composition according to the invention also comprises ii) one or more compounds chosen from carbonates, bicarbonates and mixtures thereof.

According to a more preferred embodiment, the composition according to the invention also comprises ii) one or more compounds chosen from ammonium carbonate, ammonium bicarbonate and mixtures thereof.

The compound(s) ii) are preferably present in a total content ranging from 0.01% to 20% by weight, more preferentially ranging from 1% to 15% by weight, even more preferentially ranging from 2% to 15% by weight, most preferentially ranging from 4% to 15% by weight, relative to the total weight of the composition.

Carbonates and/or Carbonate-Generating Systems

The term "carbonate-generating system" means a system which generates carbonate in situ, for instance carbon dioxide in water or percarbonate in water.

Preferably, the carbonate(s) are chosen from:
alkali metal carbonates;
alkaline-earth metal carbonates;
lanthanide carbonates;
transition metal carbonates;
bismuth carbonate;
cadmium carbonate;
thallium carbonate;
zinc carbonate;
the compounds of formula $(N^+R^1R^2R^3R^4)_2CO_3^{2-}$ wherein $R^1$, $R^2$, $R^3$ and $R^4$ represent, independently of each other, a hydrogen atom or a $(C_1\text{-}C_4)$alkyl group optionally substituted with a hydroxyl group;
guanidine carbonate;
mixtures thereof.

More preferentially, the carbonate(s) are chosen from sodium carbonate, potassium carbonate, caesium carbonate, lithium carbonate, magnesium carbonate, calcium carbonate, barium carbonate, strontium carbonate, cerium carbonate, lanthanum carbonate, yttrium carbonate, copper(II) carbonate, manganese carbonate, nickel carbonate, silver carbonate, zirconium carbonate, bismuth carbonate, cadmium carbonate, thallium carbonate, zinc carbonate, ammonium carbonate, guanidine carbonate, tetraethylammonium carbonate and mixtures thereof.

Even more preferentially, the carbonate(s) are chosen from sodium carbonate, potassium carbonate, caesium carbonate, magnesium carbonate, calcium carbonate, cerium carbonate, manganese carbonate, zinc carbonate, ammonium carbonate, guanidine carbonate and mixtures thereof.

Most preferentially, the carbonate(s) are chosen from sodium carbonate, potassium carbonate, magnesium carbonate, calcium carbonate, ammonium carbonate and mixtures thereof.

According to a particularly preferred embodiment, the carbonate included in the composition is ammonium carbonate.

The carbonate(s) and/or the carbonate-generating system(s) are preferably present in a total content ranging from 0.01% to 20% by weight, more preferentially ranging from 1% to 15% by weight, even more preferentially ranging from 2% to 15% by weight, most preferentially ranging from 4% to 15% by weight, relative to the total weight of the composition.

According to a preferred embodiment, the carbonate(s) are present in a total content ranging from 0.01% to 20% by weight, preferably ranging from 1% to 15% by weight, more preferentially ranging from 2% to 15% by weight, even more preferentially ranging from 4% to 15% by weight, relative to the total weight of the composition.

According to a preferred embodiment, the compound(s) ii) are chosen from carbonates, carbonate-generating systems and mixtures thereof, preferably from carbonates.

Bicarbonates and/or Bicarbonate-Generating Systems

The term "bicarbonate-generating system" means a system which generates bicarbonate in situ, for instance carbon dioxide in water or by buffering a carbonate with a mineral or organic acid.

Preferably, the bicarbonate(s) are chosen from:
alkali metal bicarbonates;
alkaline-earth metal bicarbonates;
the compounds of formula $N^+R^1R^2R^3R^4HCO_3$ wherein $R^1$, $R^2$, $R^3$ and $R^4$ represent, independently of each other, a hydrogen atom or a $(C_1-C_4)$alkyl group optionally substituted with a hydroxyl group;
aminoguanidine bicarbonate;
mixtures thereof.

More preferentially, the bicarbonate(s) are chosen from sodium bicarbonate, potassium bicarbonate, lithium bicarbonate, caesium bicarbonate, calcium bicarbonate, magnesium bicarbonate, ammonium bicarbonate, choline bicarbonate, triethylammonium bicarbonate, aminoguanidine bicarbonate, and mixtures thereof.

Even more preferentially, the bicarbonate(s) are chosen from sodium bicarbonate, potassium bicarbonate, caesium bicarbonate, calcium bicarbonate, magnesium bicarbonate, ammonium bicarbonate, and mixtures thereof.

Most preferentially, the bicarbonate(s) are chosen from sodium bicarbonate, potassium bicarbonate, ammonium bicarbonate and mixtures thereof.

According to a particularly preferred embodiment, the bicarbonate included in the composition is ammonium bicarbonate.

The bicarbonates may originate from a natural water, for example spring water from the Vichy basin or from La Roche Posay or Badoit water.

The bicarbonate(s) and/or the bicarbonate-generating system(s) are preferably present in a total content ranging from 0.01% to 20% by weight, more preferentially ranging from 1% to 15% by weight, even more preferentially ranging from 2% to 15% by weight, most preferentially ranging from 4% to 15% by weight, relative to the total weight of the composition.

According to a preferred embodiment, the bicarbonate(s) are present in a total content ranging from 0.01% to 20% by weight, preferably ranging from 1% to 15% by weight, more preferentially ranging from 2% to 15% by weight, even more preferentially ranging from 4% to 15% by weight, relative the total weight of the composition.

According to a preferred embodiment, the compound(s) ii) are chosen from bicarbonates, bicarbonate-generating systems and mixtures thereof, preferably from bicarbonates.

Silicates

The composition according to the invention also comprises iii) one or more silicates.

The silicate(s) are preferably water-soluble.

The term "water-soluble silicate" means a silicate which has a solubility in water at ordinary room temperature (25° C.) and at atmospheric pressure (760 mmHg) of greater than 0.5% by weight, preferably greater than 1% by weight.

Preferably, the silicate(s) are chosen from alkali metal silicates, alkaline-earth metal silicates, aluminium silicates, trimethylammonium silicates and mixtures thereof.

More preferentially, the silicate(s) are chosen from sodium silicates, potassium silicates, calcium silicates, aluminium silicates, trimethylammonium silicates and mixtures thereof.

Even more preferentially, the silicate(s) are chosen from sodium silicates. Examples of sodium silicates that may be mentioned include the compounds having the CAS numbers: [1344-09-8] and [6834-92-0].

The silicate(s) are present in a total content ranging from 3% to 35% by weight and preferably ranging from 4% to 20% by weight relative to the total weight of the composition.

The weight ratio of the total amount of (bi)carbonate(s) and/or (bi)carbonate-generating system(s) ii)/total amount of silicate(s) iii) is preferably from 0.00025 to 2000, more preferentially from 0.06 to 15 and even more preferentially from 1 to 7.5.

According to a preferred embodiment, the weight ratio of the total amount of (bi)carbonate(s) ii)/total amount of silicate(s) iii) is from 0.00025 to 2000, preferably from 0.06 to 15, more preferentially from 1 to 7.5.

The weight ratio of the total amount of (bi)carbonate(s) and/or (bi)carbonate-generating system(s) ii)/total amount of chemical oxidizing agent(s) i) is preferably from 0.0008 to 20, more preferentially from 0.1 to 5 and even more preferentially from 0.2 to 4.3.

According to a preferred embodiment, the weight ratio of the total amount of (bi)carbonate(s) ii)/total amount of chemical oxidizing agent(s) i) is from 0.0008 to 20, preferably from 0.1 to 5 and more preferentially from 0.2 to 4.3.

According to a more preferred embodiment, the weight ratio of the total amount of (bi)carbonate(s) ii)/total amount of hydrogen peroxide is from 0.0008 to 20, preferably from 0.1 to 5 and more preferentially from 0.2 to 4.3.

The weight ratio of the total amount of carbonate(s) and/or carbonate-generating system(s)/total amount of bicarbonate(s) and/or bicarbonate-generating system(s) is preferably from 0.01 to 100, more preferentially from 0.01 to 1 and even more preferentially from 0.01 to 0.75.

According to a preferred embodiment, the weight ratio of the total amount of carbonate(s)/total amount of bicarbonate(s) is from 0.01 to 100, preferably from 0.01 to 1 and more preferentially from 0.01 to 0.75.

The composition preferably comprises a total content of magnesium carbonate of less than 5% by weight, more preferably of less than 1% by weight, even more preferentially of less than 0.1% by weight, most preferentially of less than 0.01% by weight and better still of less than 0.001% by weight.

According to a particularly preferred embodiment, the composition is free of magnesium carbonate.

The composition preferably comprises a total content of persulfates of less than 10% by weight, more preferentially less than 5% by weight, even more preferentially less than 1% by weight, most preferentially less than 0.1% by weight, better still less than 0.01% by weight, and even better still less than 0.001% by weight.

According to a particularly preferred embodiment, the composition is free of persulfates.

The composition according to the invention also comprises iv) one or more oxidation dyes.

Oxidation Dyes

The oxidation dyes are generally chosen from one or more oxidation bases optionally combined with one or more coupling agents (also known as couplers).

Oxidation Bases

The composition may optionally comprise one or more oxidation bases advantageously chosen from those conventionally used in the dyeing of keratin fibres.

By way of example, the oxidation bases are chosen from para-phenylenediamines, bis(phenyl)alkylenediamines, para-aminophenols ortho-aminophenols and heterocyclic bases, and the corresponding addition salts.

Among the para-phenylenediamines that may be mentioned are, for example, para-phenylenediamine, para-toluenediamine, 2-chloro-para-phenylenediamine, 2,3-dimethyl-para-phenylenediamine, 2,6-dimethyl-para-phenylenediamine, 2,6-diethyl-para-phenylenediamine, 2,5-dimethyl-para-phenylenediamine, N,N-dimethyl-para-phenylenediamine, N,N-diethyl-para-phenylenediamine, N,N-dipropyl-para-phenylenediamine, 4-amino-N,N-diethyl-3-methylaniline, N,N-bis(β-hydroxyethyl)-para-phenylenediamine, 4-N,N-bis(β-hydroxyethyl)amino-2-methylaniline, 4-N,N-bis(β-hydroxyethyl)amino-2-chloroaniline, 2-β-hydroxyethyl-para-phenylenediamine, 2-methoxymethyl-para-phenylenediamine, 2-fluoro-para-phenylenediamine, 2-isopropyl-para-phenylenediamine, N-(β-hydroxypropyl)-para-phenylenediamine, 2-hydroxymethyl-para-phenylenediamine. N,N-dimethyl-3-methyl-para-phenylenediamine, N-ethyl-N-(β-hydroxyethyl)-para-phenylenediamine, N-(β,γ-dihydroxypropyl)-para-phenylenediamine, N-(4'-aminophenyl)-para-phenylenediamine, N-phenyl-para-phenylenediamine, 2-β-hydroxyethyloxy-para-phenylenediamine, 2-β-acetylaminoethyloxy-para-phenylenediamine, N-(β-methoxyethyl)-para-phenylenediamine, 4-aminophenylpyrrolidine, 2-thienyl-para-phenylenediamine, 2-β-hydroxyethylamino-5-aminotoluene and 3-hydroxy-1-(4'-aminophenyl)pyrrolidine, and the corresponding addition salts with an acid.

Among the para-phenylenediamines mentioned above, para-phenylenediamine, para-toluenediamine, 2-isopropyl-para-phenylenediamine, 2-β-hydroxyethyl-para-phenylenediamine, 2-β-hydroxyethyloxy-para-phenylenediamine, 2,6-dimethyl-para-phenylenediamine, 2,6-diethyl-para-phenylenediamine, 2,3-dimethyl-para-phenylenediamine, N,N-bis(β-hydroxyethyl)-para-phenylenediamine, 2-chloro-para-phenylenediamine and 2-β-acetylaminoethyloxy-para-phenylenediamine, and the corresponding addition salts with an acid, are particularly preferred.

Among the bis(phenyl)alkylenediamines that may be mentioned, for example, are N,N'-bis(β-hydroxyethyl)-N,N'-bis(4'-aminophenyl)-1,3-diaminopropanol, N,N'-bis(β-hydroxyethyl)-N,N'-bis(4'-aminophenyl)ethylenediamine, N,N'-bis(4-aminophenyl)tetramethylenediamine, N,N'-bis(β-hydroxyethyl)-N,N'-bis(4-aminophenyl)tetramethylenediamine, N,N'-bis(4-methylaminophenyl)tetramethylenediamine, N,N'-bis(ethyl)-N,N'-bis(4'-amino-3'-methylphenyl)ethylenediamine and 1,8-bis(2,5-diaminophenoxy)-3,6-dioxaoctane, and the corresponding addition salts.

Among the para-aminophenols that are mentioned are, for example, para-aminophenol, 4-amino-3-methylphenol, 4-amino-3-fluorophenol, 4-amino-3-chlorophenol, 4-amino-3-hydroxymethylphenol, 4-amino-2-methylphenol, 4-amino-2-hydroxymethylphenol, 4-amino-2-methoxymethylphenol, 4-amino-2-aminomethylphenol, 4-amino-2-(β-hydroxyethylaminomethyl)phenol and 4-amino-2-fluorophenol, and the corresponding addition salts with an acid.

Among the ortho-aminophenols that may be mentioned, for example, are 2-aminophenol, 2-amino-5-methylphenol, 2-amino-6-methylphenol and 5-acetamido-2-aminophenol, and the corresponding addition salts.

Among the heterocyclic bases that may be mentioned, for example, are pyridine, pyrimidine and pyrazole derivatives.

Among the pyridine derivatives that may be mentioned are the compounds described, for example, in patents GB 1 026 978 and GB 1 153 196, for example 2,5-diaminopyridine, 2-(4-methoxyphenyl)amino-3-aminopyridine and 3,4-diaminopyridine, and the corresponding addition salts.

Other pyridine oxidation bases that are useful in the present invention are the 3-aminopyrazolo[1,5-a]pyridine oxidation bases or the corresponding addition salts described, for example, in patent application FR 2 801 308. Examples that may be mentioned include pyrazolo[1,5-a]pyrid-3-ylamine, 2-acetylaminopyrazolo[1,5-a]pyrid-3-ylamine, 2-(morpholin-4-yl)pyrazolo[1,5-a]pyrid-3-ylamine, 3-aminopyrazolo[1,5-a]pyridine-2-carboxylic acid, 2-methoxypyrazolo[1,5-a]pyrid-3-ylamine, (3-aminopyrazolo[1,5-a]pyrid-7-yl)methanol, 2-(3-aminopyrazolo[1,5-a]pyrid-5-yl)ethanol, 2-(3-aminopyrazolo[1,5-a]pyrid-7-yl)ethanol, (3-aminopyrazolo[1,5-a]pyrid-2-yl)methanol, 3,6-diaminopyrazolo[1,5-a]pyridine, 3,4-diaminopyrazolo[1,5-a]pyridine, pyrazolo[1,5-a]pyridine-3,7-diamine, 7-(morpholin-4-yl)pyrazolo[1,5-a]pyrid-3-ylamine, pyrazolo[1,5-a]pyridine-3,5-diamine, 5-(morpholin-4-yl)pyrazolo[1,5-a]pyrid-3-ylamine, 2-[(3-aminopyrazolo[1,5-a]pyrid-5-yl)(2-hydroxyethyl)amino]ethanol, 2-[(3-aminopyrazolo[1,5-a]pyrid-7-yl)(2-hydroxyethyl)amino]ethanol, 3-aminopyrazolo[1,5-a]pyridin-5-ol, 3-aminopyrazolo[1,5-a]pyridin-4-ol, 3-aminopyrazolo[1,5-a]pyridin-6-ol, 3-aminopyrazolo[1,5-a]pyridin-7-ol, 2-β-hydroxyethoxy-3-aminopyrazolo[1,5-a]pyridine and 2-(4-dimethylpiperazinium-1-yl)-3-aminopyrazolo[1,5-a]pyridine, and the corresponding addition salts.

More particularly, the oxidation bases that are useful in the present invention are chosen from 3-aminopyrazolo[1,5-a]pyridines and are preferably substituted on carbon atom 2 with:

a) a (di)($C_1$-$C_6$)(alkyl)amino group, said alkyl group possibly being substituted with at least one hydroxyl, amino or imidazolium group;

b) an optionally cationic 5- to 7-membered heterocycloalkyl group comprising from 1 to 3 heteroatoms, optionally substituted with one or more ($C_1$-$C_6$)alkyl groups such as a di($C_1$-$C_4$)alkylpiperazinium group; or c) a ($C_1$-$C_6$)alkoxy group optionally substituted with one or more hydroxyl groups, such as a β-hydroxyalkoxy group, and the corresponding addition salts.

Among the pyrimidine derivatives that may be mentioned are the compounds described, for example, in patents DE 2359399; JP 88-169571; JP 05-63124; EP 0770375 or patent application WO 96/15765, such as 2,4,5,6-tetraaminopyrimidine, 4-hydroxy-2,5,6-triaminopyrimidine, 2-hydroxy-4,5,6-triaminopyrimidine, 2,4-dihydroxy-5,6-diaminopyrimidine, 2,5,6-triaminopyrimidine and the addition salts thereof and the tautomeric forms thereof, when a tautomeric equilibrium exists.

Among the pyrazole derivatives that may be mentioned are the compounds described in patents DE 3843892 and DE 4133957 and patent applications WO 94/08969, WO 94/08970, FR-A-2 733 749 and DE 195 43 988, for instance 4,5-diamino-1-methylpyrazole, 4,5-diamino-1-(β-hydroxyethyl)pyrazole, 3,4-diaminopyrazole, 4,5-diamino-1-(4'-chlorobenzyl)pyrazole, 4,5-diamino-1,3-dimethylpyrazole, 4,5-diamino-3-methyl-1-phenylpyrazole, 4,5-diamino-1-methyl-3-phenylpyrazole, 4-amino-1,3-dimethyl-5-hydrazinopyrazole, 1-benzyl-4,5-diamino-3-methylpyrazole, 4,5-diamino-3-tert-butyl-1-methylpyrazole, 4,5-diamino-1-tert-butyl-3-methylpyrazole, 4,5-diamino-1-(β-hydroxyethyl)-3-methylpyrazole, 4,5-diamino-1-ethyl-3-methylpyrazole, 4,5-diamino-1-ethyl-3-(4'-methoxyphenyl)pyrazole, 4,5-diamino-1-ethyl-3-hydroxymethylpyrazole, 4,5-diamino-3-hydroxymethyl-1-methylpyrazole, 4,5-diamino-3-hydroxymethyl-1-isopropylpyrazole, 4,5-diamino-3-methyl-1-isopropylpyrazole, 4-amino-5-(2'-aminoethyl)amino-1,3-dimethylpyrazole, 3,4,5-triaminopyrazole, 1-methyl-3,4,5-triaminopyrazole, 3,5-diamino-1-methyl-4-methylaminopyrazole and 3,5-diamino-4-(R-hydroxyethyl)amino-1-methylpyrazole, and the corresponding addition salts. Use may also be made of 4,5-diamino-1-(β-methoxyethyl)pyrazole.

A 4,5-diaminopyrazole will preferably be used and even more preferentially 4,5-diamino-1-(β-hydroxyethyl)pyrazole and/or a corresponding salt.

The pyrazole derivatives that may also be mentioned comprise diamino-N,N-dihydropyrazolopyrazolones and in particular those described in patent application FR-A-2 886 136, such as the following compounds and the corresponding addition salts: 2,3-diamino-6,7-dihydro-1H,5H-pyrazolo[1,2-a]pyrazol-1-one, 2-amino-3-ethylamino-6,7-dihydro-1H,5H-pyrazolo[1,2-a]pyrazol-1-one, 2-amino-3-isopropylamino-6,7-dihydro-1H,5H-pyrazolo[1,2-a]pyrazol-1-one, 2-amino-3-(pyrrolidin-1-yl)-6,7-dihydro-1H,5H-pyrazolo[1,2-a]pyrazol-1-one, 4,5-diamino-1,2-dimethyl-1,2-dihydropyrazol-3-one, 4,5-diamino-1,2-diethyl-1,2-dihydropyrazol-3-one, 4,5-diamino-1,2-bis(2-hydroxyethyl)-1,2-dihydropyrazol-3-one, 2-amino-3-(2-hydroxyethyl)amino-6,7-dihydro-1H,5H-pyrazolo[1,2-a]pyrazol-1-one, 2-amino-3-dimethylamino-6,7-dihydro-1H,5H-pyrazolo[1,2-a]pyrazol-1-one, 2,3-diamino-5,6,7,8-tetrahydro-1H,6H-pyridazino[1,2-a]pyrazol-1-one, 4-amino-1,2-diethyl-5-(pyrrolidin-1-yl)-1,2-dihydropyrazol-3-one, 4-amino-5-(3-dimethylaminopyrrolidin-1-yl)-1,2-diethyl-1,2-dihydropyrazol-3-one and 2,3-diamino-6-hydroxy-6,7-dihydro-1H,5H-pyrazolo[1,2-a]pyrazol-1-one.

Use will preferably be made of 2,3-diamino-6,7-dihydro-1H,5H-pyrazolo[1,2-a]pyrazol-1-one and/or a corresponding salt.

Heterocyclic bases that will preferably be used are 4,5-diamino-1-(β-hydroxyethyl)pyrazole and/or 2,3-diamino-6,7-dihydro-1H,5H-pyrazolo[1,2-a]pyrazol-1-one and/or a corresponding salt.

Coupling Agents

The composition may optionally comprise one or more coupling agents advantageously chosen from those conventionally used in the dyeing of keratin fibres.

Among these coupling agents, mention may be made in particular of meta-phenylenediamines, meta-aminophenols, meta-diphenols, naphthalene-based coupling agents and heterocyclic coupling agents, and also the corresponding addition salts. Mention may be made, for example, of 1,3-dihydroxybenzene, 1,3-dihydroxy-2-methylbenzene, 4-chloro-1,3-dihydroxybenzene, 2,4-diamino-1-(β-hydroxyethyloxy)benzene, 2-amino-4-(β-hydroxyethylamino)-1-methoxybenzene, 1,3-diaminobenzene, 1,3-bis(2,4-diaminophenoxy)propane, 3-ureidoaniline, 3-ureido-1-dimethylaminobenzene, sesamol, 1-β-hydroxyethylamino-3,4-methylenedioxybenzene, α-naphthol, 2-methyl-1-naphthol, 6-hydroxyindole, 4-hydroxyindole, 4-hydroxy-N-methylindole, 2-amino-3-hydroxypyridine, 6-hydroxybenzomorpholine, 3,5-diamino-2,6-dimethoxypyridine, 1-N-(β-hydroxyethyl)amino-3,4-methylenedioxybenzene, 2,6-bis(3-hydroxyethylamino)toluene, 6-hydroxyindoline, 2,6-dihydroxy-4-methylpyridine, 1-H-3-methylpyrazol-5-one, 1-phenyl-3-methylpyrazol-5-one, 2,6-dimethylpyrazolo[1,5-b]-1,2,4-triazole, 2,6-dimethyl[3,2-c]-1,2,4-triazole and 6-methylpyrazolo[1,5-a]benzimidazole, 2-methyl-5-aminophenol, 5-N-(β-hydroxyethyl)amino-2-methylphenol, 3-aminophenol and 3-amino-2-chloro-6-methylphenol, the corresponding addition salts with an acid and the corresponding mixtures.

In general, the addition salts of oxidation bases and coupling agents that may be used in the context of the invention are chosen in particular from the addition salts with an acid such as the hydrochlorides, hydrobromides, sulfates, citrates, succinates, tartrates, lactates, tosylates, benzenesulfonates, phosphates and acetates.

The oxidation dye(s) may be present in the composition in a total content ranging from 0.001% to 5% by weight, preferably from 0.01% to 3% by weight, more preferentially from 0.1% to 0.1% by weight, even more preferentially from 0.1% to 0.5% by weight, relative to the total weight of the composition.

Direct Dyes

The composition according to the invention may also comprise one or more direct dyes.

The direct dye(s) may be chosen from neutral, cationic and anionic direct dyes and mixtures thereof.

The direct dyes may be neutral, cationic or anionic direct dyes chosen from: acridines; acridones; anthranthrones; anthrapyrimidines; anthraquinones; azines; (poly)azos or azos, hydrazono or hydrazones, in particular arylhydrazones; azomethines; benzanthrones; benzimidazoles; benzimidazolones; benzindoles; benzoxazoles; benzopyrans; benzothiazoles; benzoquinones; bis-isoindolines; carboxanilides; coumarins; cyanines, such as (di)azacarbocyanines, (di)azahemicyanines, hemicyanines or tetraazacarbocyanines; (di)azines; bis-azines; (di)oxazines; (di)thiazines; (di)phenylamines; (di)phenylmethanes; (di)ketopyrrolopyrroles; flavonoids, such as flavanthrones and flavones; fluorindines; formazans; indamines; indanthrones; indigoids, thioindigoids and pseudoindigoids; indophenols; indoanilines; isoindolines; isoindolinones; isoviolanthrones; lactones; (poly)methines, such as dimethines of stilbene or styryl types; naphthalimides; naphthanilides; naphtholactams; naphthoquinones; nitro, notably nitro(hetero)aromatics; oxadiazoles; oxazines; perilones; perinones; perylenes; phenazines; phenoxazines; phenothiazines; phthalocyanines; polyenes/carotenoids; porphyrins; pyranthrones; pyrazolanthrones; pyrazolones; pyrimidinoanthrones; pyronines; quinacridones; quinolines; quinophthalones; squaranes; tetrazolines; thiazines; thiopyronines; triarylmethanes or xanthenes and natural direct dyes. Preferably, the direct dyes are chosen from anthraquinones, (poly)azos, azomethines and stilbenes, more preferentially from anthraquinones.

The direct dyes may be chosen in particular from neutral, cationic or anionic nitrobenzene direct dyes, neutral, cationic or anionic azo direct dyes, neutral, cationic or anionic tetraazapentamethine dyes, cationic or anionic quinone dyes and in particular neutral, cationic or anionic anthraquinone dyes, neutral, cationic or anionic azine direct dyes, neutral, cationic or anionic triarylmethane direct dyes, neutral, cationic or anionic azomethine direct dyes and natural direct dyes. Preferably, the direct dyes are chosen from neutral or anionic anthraquinone dyes and stilbenes.

As neutral, anionic or cationic direct dyes that may be used in the present invention, mention may be made of the following dyes: acridines; acridones; anthranthrones; anthrapyrimidines; anthraquinones; azines; (poly)azos, hydrazono or hydrazones, in particular arylhydrazones; azomethines; benzanthrones; benzimidazoles; benzimidazolones; benzindoles; benzoxazoles; benzopyrans; benzothiazoles; benzoquinones; bisazines; bis-isoindolines; carboxanilides; coumarins; cyanines, such as azacarbocyanines, diazacarbocyanines, diazahemicyanines, hemicyanines or tetraazacarbocyanines; diazines; diketopyrrolopyrroles; dioxazines; diphenylamines; diphenylmethanes; dithiazines; flavonoids, such as flavanthrones and flavones; fluorindines; formazans; indamines; indanthrones; indigoids and pseudoindigoids; indophenols; indoanilines; isoindolines; isoindolinones; isoviolanthrones; lactones; (poly)methines, such as dimethines of stilbene or styryl types; naphthalimides; naphthanilides; naphtholactams; naphthoquinones; nitro, notably nitro(hetero)aromatics; oxadiazoles; oxazines; perilones; perinones; perylenes; phenazines; phenoxazine; phenothiazines; phthalocyanine; polyenes/carotenoids; porphyrins; pyranthrones; pyrazolanthrones; pyrazolones; pyrimidinoanthrones; pyronines; quinacridones; quinolines; quinophthalones; squaranes; tetrazoles; thiazines; thioindigo; thiopyronines; triarylmethanes or xanthenes.

Neutral Direct Dyes

The direct dyes may be neutral direct dyes, preferably chosen from the hydrazono dyes of formulae (IIIa) and (III'a), the azo and styryl dyes (IVa), the diazo and distyryl dyes (IV'a) and (IV"a), the anthraquinone dyes (Va) and the azomethine dyes (VIa) and (VI'a) below, and mixtures thereof:

(IIIa)

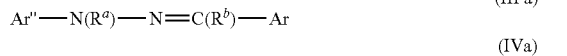
(III'a)

(IVa)

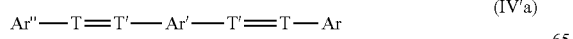
(IV'a)

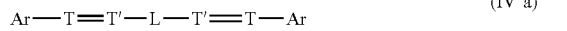
(IV"a)

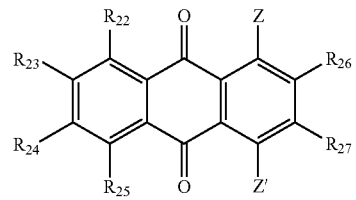
(Va)

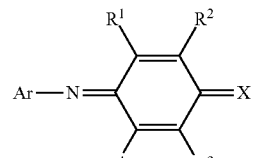
(VIa)

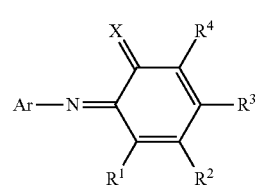
(VI'a)

in which formulae (IIIa), (III'a), (IVa), (IV'a), (IV"a), (Va), (VIa) and (VI'a):

Ar represents an aryl radical, such as phenyl or naphthyl, substituted with at least one electron-donating group such as i) optionally substituted $(C_1-C_8)$alkyl, ii) optionally substituted $(C_1-C_8)$alkoxy, iii) (di)$(C_1-C_8)$(alkyl)amino optionally substituted on the alkyl group(s) with a hydroxyl group, iv) aryl$(C_1-C_8)$alkylamino, v) optionally substituted N—$(C_1-C_8)$alkyl-N-aryl$(C_1-C_8)$alkylamino, or Ar represents a julolidine group;

Ar' represents an optionally substituted divalent (hetero) arylene group such as phenylene, particularly paraphenylene, or naphthalene, which is optionally substituted, preferably with one or more $(C_1-C_8)$alkyl, hydroxyl or $(C_1-C_8)$alkoxy groups;

Ar" represents a (hetero)aryl radical, which is optionally substituted, preferably with at least i) an electron-withdrawing group such as nitro, nitroso, —C(X)—X'—R' or ii) a (di)$(C_1-C_6)$(alkyl)amino group, iii) hydroxyl, iv) $(C_1-C_6)$alkoxy; (hetero)aryl is particularly chosen from imidazolyl, triazolyl, indolyl or pyridyl or phenyl optionally substituted with at least one group chosen from nitro, nitroso and amino, preferably substituted in the para position of the phenyl group;

X, X' and X", which may be identical or different, represent an oxygen or sulfur atom, or a group NR", preferably an oxygen atom;

$R^1$, $R^2$, $R^3$ and $R^4$, which may be identical or different, represent a hydrogen or halogen atom, or a group chosen from hydroxyl, thiol, $(C_1-C_4)$alkyl, $(C_1-C_4)$alkoxy, (di)$(C_1-C_4)$(alkyl)amino, nitro and nitroso;

R' and R" represent a $(C_1-C_4)$alkyl group;

$R^a$ and $R^b$, which may be identical or different, represent a hydrogen atom or a $(C_1-C_8)$alkyl group, which is optionally substituted, preferably with a hydroxyl group;

or, as a variant, the substituent $R^a$ with a substituent of Ar" and/or $R^b$ with a substituent of Ar and/or $R^a$ with $R^b$ form, together with the atoms that bear them, a (hetero)cycloalkyl;

in particular, R$^a$ and R$^b$ represent a hydrogen atom or a (C$_1$-C$_4$)alkyl group, which is optionally substituted with a hydroxyl group;

T and T', which may be identical or different, represent a group C(R$^a$) or N, preferably N; and L represents a divalent group -ALK-, —C(X)-ALK-, -ALK—C(X)— or —C(X)-ALK-C(X')-, with ALK representing a linear or branched (C$_1$-C$_6$)alkylene group, such as methylene, and X and X' as defined previously;

R$_{22}$, R$_{23}$, R$_{24}$, R$_{25}$, R$_{26}$ and R$_{27}$, which may be identical or different, represent a hydrogen or halogen atom, or a group chosen from:

(C$_1$-C$_6$)alkyl;
hydroxyl, mercapto;
(C$_1$-C$_6$)alkoxy, (C$_1$-C$_6$)alkylthio;
aryloxy or arylthio;
aryl(C$_1$-C$_6$)(alkyl)amino;
(di)(C$_1$-C$_6$)(alkyl)amino;
(di)(hydroxy(C$_1$-C$_6$)alkyl)amino;

Z' represents a hydrogen atom or a group NR$_{28}$R$_{29}$ with R$_{28}$ and R$_{29}$, which may be identical or different, representing a hydrogen atom or a group chosen from:

(C$_1$-C$_6$)alkyl;
polyhydroxy(C$_1$-C$_6$)alkyl such as hydroxyethyl;
aryl optionally substituted with one or more groups, particularly i) (C$_1$-C$_6$)alkyl; iii) R°—C(X)—X'—, R°—X'—C(X)— or R°—X'—C(X)—X"— with R° representing a (C$_1$-C$_6$)alkyl group and X, X' and X" as defined previously; iv) a sulfonate;
cycloalkyl; notably cyclohexyl;

Z represents a group chosen from hydroxyl and NR'$_{28}$R'$_{29}$ with R'$_{28}$ and R'$_{29}$, which may be identical or different, representing the same atoms or groups as R$_{28}$ and R$_{29}$ as defined previously.

The direct dyes of formula (IV"a) are preferably of formula (IV'''a)

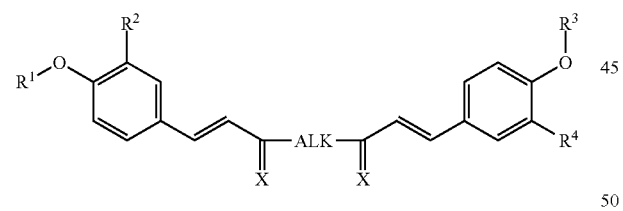

in which formula (IV'''a):

R$^1$ and R$^3$, which may be identical or different, preferably identical, represent a hydrogen atom, a (C$_1$-C$_4$)alkyl group such as methyl or a sugar such as glucosyl, preferably a hydrogen atom;

R$^2$ and R$^4$, which may be identical or different, preferably identical, represent a hydrogen atom, a (C$_1$-C$_4$)alkyl or (C$_1$-C$_4$)alkoxy group or an —O-sugar group such as —O— glucosyl, preferably (C$_1$-C$_4$)alkoxy; such as methoxy;

X, which may be identical or different, preferably identical, represent an oxygen or sulfur atom or N—R with R representing a hydrogen atom or a group, preferably an oxygen atom;

ALK represents a (C$_1$-C$_4$)alkylene group such as methylene or ethylene, preferably methylene.

The direct dyes of formula (IV"a) may be derived from curcumin, demethoxycurcumin and bis-demethoxycurcumin.

Preferably, the direct dyes are chosen from the direct dyes of formulae (IV"a) and (IV'''a) and mixtures thereof as defined previously.

According to a particularly preferred embodiment, the direct dyes are neutral direct dyes chosen from the following compounds (A) to (G) and mixtures thereof:

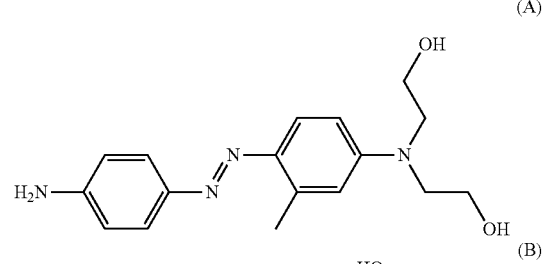

(A)

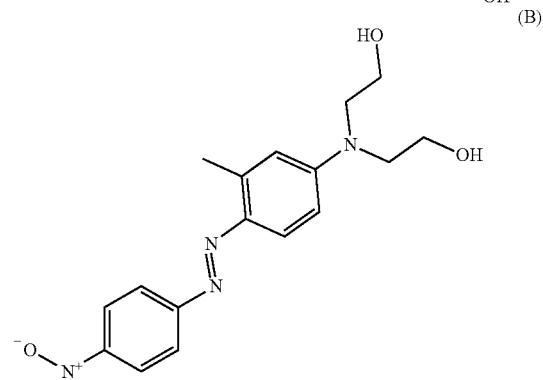

(B)

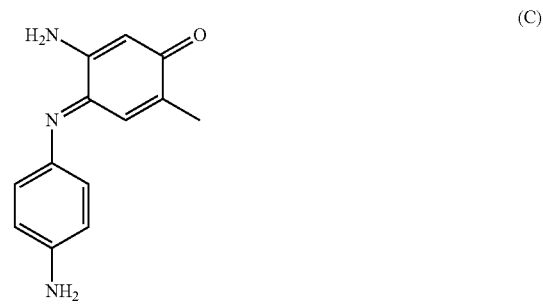

(C)

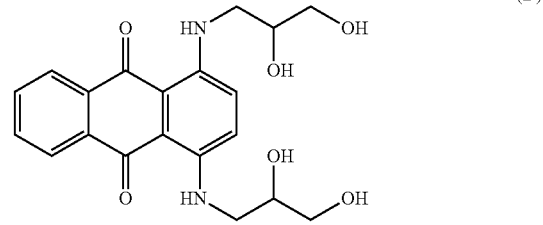

(D)

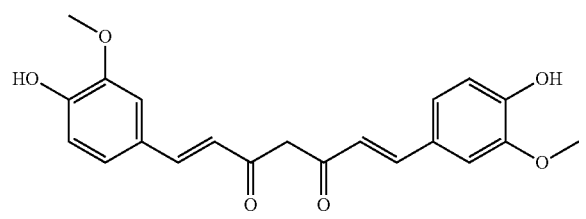

(E)

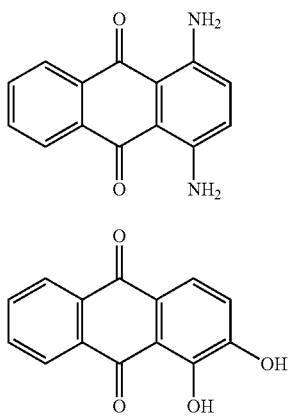

(F)

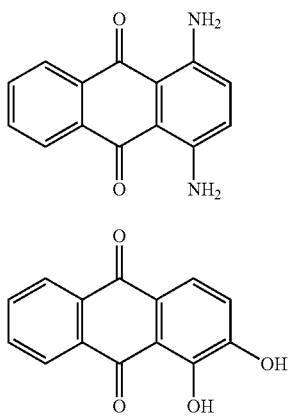

(G)

preferably from the compounds (E), (F) and (G) and mixtures thereof, more preferentially from the compounds (E) and (G) and mixtures thereof.

Cationic Direct Dyes

The direct dyes may be chosen from direct dyes which are cationic or commonly referred to as "basic dyes" for their affinity with acidic substances notably including in their structure at least one endocycdicor exocyclic cationic or cationizable group.

As cationic azo dyes that can be used in the present invention, mention may be made particularly of the cationic dyes described in Kirk-Othmer's encyclopaedia of Chemical Technology, "Dyes, Azo", J. Wiley & Sons, updated on 19 Apr. 2010.

Mention may also be made of the cationic azo dyes described in patent applications WO 95/15144, WO 95/01772 and EP 714 954.

Mention may also be made of the cationic azo dyes described in the Colour Index International 3rd Edition, notably of the following compounds: Basic Red 22; Basic Red 76; Basic Yellow 57; Basic Brown 16; Basic Brown 17.

Among the cationic quinone dyes, those mentioned in the Colour Index International 3rd Edition, are suitable for use and, among these, mention may be made, inter alia, of the following dyes: Basic Blue 22; Basic Blue 99.

Among the azine dyes that are suitable for use, mention may be made of those listed in the Colour Index International 3rd Edition, for example the following dyes: Basic Blue 17, Basic Red 2.

Among the cationic triarylmethane dyes that may be used according to the invention, mention may be made, in addition to those listed in the Colour Index International 3rd Edition, of the following dyes: Basic Green 1, Basic Violet 3, Basic Violet 14, Basic Blue 7, Basic Blue 26.

Mention may also be made of the direct dyes described in U.S. Pat. No. 5,888,252, EP 1 133 975, WO 03/029 359, EP 860 636, WO 95/01772, WO 95/15144 and EP 714 954.

Mention may also be made of those listed in the encyclopaedia "The Chemistry of Synthetic Dyes" by K. Venkataraman, 1952, Academic Press, volumes 1 to 7, in the "Kirk-Othmer Encyclopaedia of Chemical Technology", in the chapter "Dyes and Dye Intermediates", 1993, Wiley and Sons, and in various chapters of "Ullmann's Encyclopaedia of Industrial Chemistry", 7th edition, Wiley and Sons.

Preferably, the cationic direct dyes are chosen from those resulting from dyes of azo and hydrazono type.

The cationic direct dyes may be cationic azo dyes, as described in EP 850 636, FR 2 788 433, EP 920 856, WO 99/48465, FR 2 757 385, EP 850 637, EP 918 053, WO 97/44004, FR 2 570 946, FR 2 285 851, DE 2 538 363, FR 2 189 006, FR 1 560 664, FR 1 540 423, FR 1 567 219, FR 1 516 943, FR 1 221 122, DE 4220388, DE 4 137 005, WO 01/66646, U.S. Pat. No. 5,708,151, WO 95/01772, WO 515 144, GB 1 195 386, U.S. Pat. Nos. 3,524,842, 5,879,413, EP 1 062 940, EP 1 133 976, GB 738 585, DE 2 527 638, FR 2 275462, GB 1974-27645, Acta Histochem. (1978), 61(1), 48-52; Tsitologiya (1968), 10(3), 403-5; Zh. Obshch. Khim. (1970), 40(1), 195-202; Ann. Chim. (Rome) (1975), 65(5-6), 305-14; Journal of the Chinese Chemical Society (Taipei) (1998), 45(1), 209-211; Rev. Roum. Chim. (1988), 33(4), 377-83; Text. Res. J. (1984), 54(2), 105-7; Chim. Ind. (Milan) (1974), 56(9), 600-3; Khim. Tekhnol. (1979), 22(5), 548-53; Ger. Monatsh. Chem. (1975), 106(3), 643-8; MRL Bull. Res. Dev. (1992), 6(2), 21-7; Lihua Jianyan, Huaxue Fence (1993), 29(4), 233-4; Dyes Pigm. (1992), 19(1), 69-79; Dyes Pigm. (1989), 11(3), 163-72.

Preferably, the cationic direct dyes comprise a quaternary ammonium group; more preferentially, the cationic charge is endocyclic. These cationic groups are, for example, a cationic group:

bearing a (di/tri)($C_1$-$C_8$)alkylammonium exocyclic charge, or bearing an endocyclic charge, such as comprising a cationic heteroaryl group chosen from: acridinium, benzimidazolium, benzobistriazolium, benzopyrazolium, benzopyridazinium, benzoquinolium, benzothiazolium, benzotriazolium, benzoxazolium, bipyridinium, bis-tetrazolium, dihydrothiazolium, imidazopyridinium, imidazolium, indolium, isoquinolium, naphthoimidazolium, naphthoxazolium, naphthopyrazolium, oxadiazolium, oxazolium, oxazolopyridinium, oxonium, phenazinium, phenooxazolium, pyrazinium, pyrazolium, pyrazoyltriazolium, pyridinium, pyridinoimidazolium, pyrrolium, pyrylium, quinolium, tetrazolium, thiadiazolium, thiazolium, thiazolopyridinium, thiazoylimidazolium, thiopyrylium, triazolium or xanthylium.

Mention may be made of the cationic hydrazono direct dyes of formulae (IIb) and (IIIb) and the azo direct dyes of formulae (IVb) and (Vb) below:

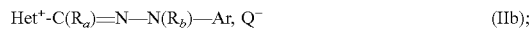 (IIb);

 (IIIb);

 (IVb);

 (Vb);

in which formulae (IIb) to (Vb):

Het+ represents a cationic heteroaryl group, preferentially bearing an endocyclic cationic charge, such as imidazolium, indolium or pyridinium, which is optionally substituted, preferentially with at least one ($C_1$-$C_8$) alkyl group such as methyl;

Ar+ represents an aryl group, such as phenyl or naphthyl, bearing an exocyclic cationic charge, preferentially ammonium, particularly tri($C_1$-$C_8$)alkylammonium, such as trimethylammonium;

Ar represents an aryl group, notably phenyl, which is optionally substituted, preferentially with one or more electron-donating groups such as i) optionally substituted ($C_1$-$C_8$)alkyl, ii) optionally substituted ($C_1$-$C_8$) alkoxy, iii) (di)($C_1$-$C_8$)(alkyl)amino optionally substituted on the alkyl group(s) with a hydroxyl group, iv) aryl($C_1$-$C_8$)alkylamino, v) optionally substituted N—(C₁-C₈)alkyl-N-aryl(C₁-C₈)alkylamino or alternatively Ar represents a julolidine group;

Ar" represents an optionally substituted (hetero)aryl group, such as phenyl or pyrazolyl, which are optionally substituted, preferentially with one or more (C₁-C₈)alkyl, hydroxyl, (di)(C₁-C₈)(alkyl)amino, (C₁-C₈) alkoxy or phenyl groups;

$R_a$ and $R_b$, which may be identical or different, represent a hydrogen atom or a (C₁-C₈)alkyl group which is optionally substituted, preferentially with a hydroxyl group;

or else the substituent $R_a$ with a substituent of Het⁺ and/or $R_b$ with a substituent of Ar and/or $R_a$ with $R_b$ form, together with the atoms which bear them, a (hetero) cycloalkyl; in particular, $R_a$ and $R_b$ represent a hydrogen atom or a (C₁-C₄)alkyl group optionally substituted with a hydroxyl group;

Q⁻ represents an anionic counterion such as a halide, an alkyl sulfate or an alkylsulfonate.

In particular, mention may be made of the azo and hydrazono direct dyes bearing an endocyclic cationic charge of formulae (IIb) to (Vb) as defined previously. More particularly, mention may be made of the cationic direct dyes of formulae (IIb) to (Vb) bearing an endocyclic cationic charge described in patent applications WO 95/15144, WO 95/01772 and EP 714 954.

Preferably, mention may be made of the following direct dyes:

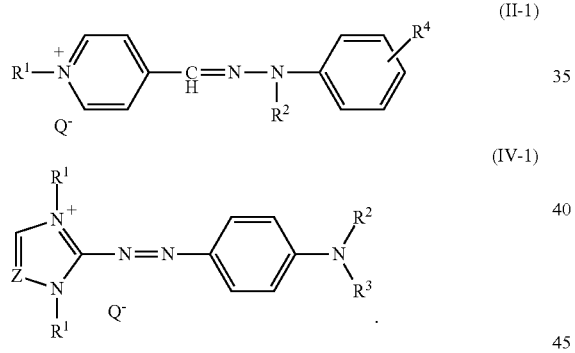

in which formulae (II-1) and (IV-1):

$R^1$ represents a (C₁-C₄)alkyl group, such as methyl;

$R^2$ and $R^3$, which may be identical or different, represent a hydrogen atom or a (C₁-C₄)alkyl group, such as methyl;

$R^4$ represents a hydrogen atom or an electron-donating group such as optionally substituted (C₁-C₈)alkyl, optionally substituted (C₁-C₈)alkoxy, or (di)(C₁-C₈) (alkyl)amino optionally substituted on the alkyl group(s) with a hydroxyl group; in particular, $R^4$ is a hydrogen atom;

Z represents a CH group or a nitrogen atom, preferentially CH,

Q⁻ is an anionic counterion as defined previously, in particular a halide, such as chloride, or an alkyl sulfate, such as methyl sulfate or mesyl.

Particularly, the dyes of formulae (II-1) and (IV-1) are chosen from Basic Red 51, Basic Yellow 87 and Basic Orange 31 or derivatives thereof:

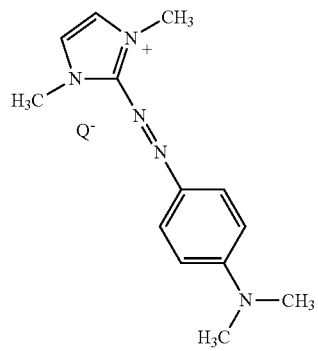

Basic Red 51

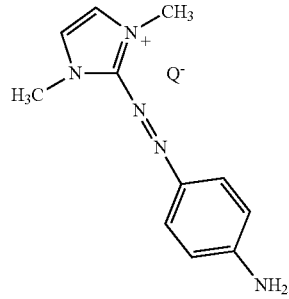

Basic Orange 31

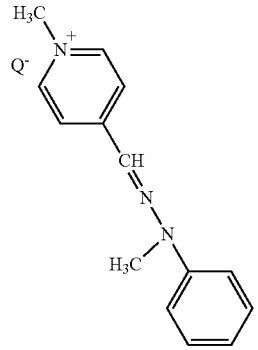

Basic Yellow 87 with Q⁻ being an anionic counterion as defined previously, in particular a halide, such as chloride, or an alkyl sulfate, such as methyl sulfate or mesyl.

Fluorescent Dyes

The direct dyes may be chosen from fluorescent direct dyes.

As examples of fluorescent dyes that may be used in the present invention, mention may be made of neutral, anionic or cationic dyes chosen from the following dyes: acridines, acridones, benzanthrones, benzimidazoles, benzimidazolones, benzindoles, benzoxazoles, benzopyrans, benzothiazoles, coumarins, difluoro{2-[(2H-pyrrol-2-ylidene-kN) methyl]-1H-pyrrolato-kN}borons (BODIPY®), diketopyrrolopyrroles, fluorindines, (poly)methines (notably cyanines and styryls/hemicyanines), naphthalimides, naphthanilides, naphthylamines (such as dansyls), oxadiazoles, oxazines, perilones, perinones, perylenes, polyenes/carotenoids, squaranes, stilbenes, xanthenes.

Mention may also be made of the fluorescent dyes described in EP 1 133 975, WO 03/029 359, EP 860 636, WO 95/01772, WO 95/15144 and EP 714 954 and those listed in the encyclopaedia "The Chemistry of Synthetic Dyes" by K. Venkataraman, 1952, Academic Press, volumes 1 to 7, in the "Kirk-Othmer Encyclopaedia of Chemical Technology", in the chapter "Dyes and Dye Intermediates", 1993, Wiley and Sons, and in various chapters of "Ullmann's Encyclopaedia of Industrial Chemistry", 7th edition, Wiley and Sons, and in the handbook—"A Guide to Fluorescent Probes and Labeling Technologies", 10th Ed., Molecular Probes/Invitrogen—Oregon 2005, circulated on the Internet or in the preceding printed editions.

According to a preferred variant, the fluorescent dye(s) are cationic polymethines and comprise at least one quaternary ammonium group, such as those of formula (Vb) below:

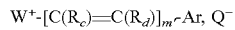

in which formula (Vb):

W⁺ represents a cationic heterocyclic or heteroaryl group, particularly comprising a quaternary ammonium optionally substituted with one or more $(C_1-C_8)$alkyl groups, optionally substituted notably with one or more hydroxyl groups;

Ar representing an aryl group such as phenyl or naphthyl, optionally substituted preferentially with i) one or more halogen atoms such as chlorine or fluorine; ii) one or more $(C_1-C_8)$alkyl and preferably $(C_1-C_4)$alkyl groups such as methyl; iii) one or more hydroxyl groups; iv) one or more $(C_1-C_8)$alkoxy groups such as methoxy; v) one or more hydroxy$(C_1-C_8)$alkyl groups such as hydroxyethyl, vi) one or more amino groups or (di)$(C_1-C_8)$alkylamino, preferably with the $C_1-C_4$ alkyl part optionally substituted with one or more hydroxyl groups, such as (di)hydroxyethylamino, vii) with one or more acylamino groups; viii) one or more heterocycloalkyl groups such as piperazinyl, piperidyl or 5- or 6-membered heteroaryl such as pyrrolidinyl, pyridyl and imidazolinyl;

m' represents an integer ranging from 1 to 4; preferably, m' is equal to 1 or 2; more preferentially, m'=1;

$R_c$ and $R_d$, which may be identical or different, represent a hydrogen atom or an optionally substituted $(C_1-C_8)$ alkyl group, preferably an optionally substituted $(C_1-C_4)$alkyl group, or alternatively $R_c$ contiguous with W⁺ and/or $R_d$ contiguous with Ar form, with the atoms which bear them, a (hetero)cycloalkyl; in particular, $R_c$ is contiguous with W⁺ and they form a (hetero)cycloalkyl, such as cyclohexyl;

Q⁻ is an anionic counterion as defined previously.

Anionic Dyes

The direct dyes may be chosen from anionic direct dyes or dyes commonly referred to as "acidic" direct dyes on account of their affinity with alkaline substances.

The term "anionic direct dye" means any direct dye including in its structure at least one $CO_2R$ or $SO_3R$ substituent with R denoting a hydrogen atom or a cation originating from a metal or an amine, or an ammonium ion. The anionic dyes may be chosen from direct nitro acid dyes, azo acid dyes, azine acid dyes, triarylmethane acid dyes, indoamine acid dyes, anthraquinone acid dyes, indigoid dyes and natural acid dyes.

Preferably, the anionic direct dyes are acidic anthraquinones.

The direct dyes may be anionic direct dyes preferably chosen from the dyes of formulae (III), (III'), (IV), (IV'), (V), (V'), (VI), (VI'), (VII), (VIII), (IX) and (X) below, and mixtures thereof:

a) the diaryl anionic azo dyes of formula (III) or (III'):

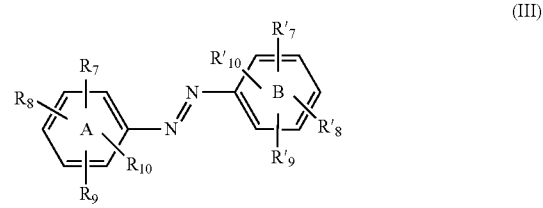

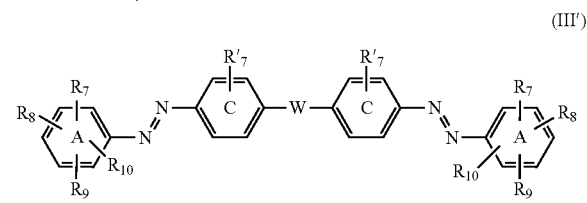

in which formulae (III) and (III'):

$R_7$, $R_8$, $R_9$, $R_{10}$, $R'_7$, R's, $R'_s$ and $R'_{10}$, which may be identical or different, represent a hydrogen atom or a group chosen from:

$(C_1-C_6)$alkyl;

$(C_1-C_6)$alkoxy, $(C_1-C_6)$alkylthio; hydroxyl, mercapto; nitro, nitroso;

R°—C(X)—X'—, R°—X'—C(X)—, R°—X'—C(X)—X"— with R° representing a hydrogen atom or a $(C_1-C_6)$alkyl or aryl group such as phenyl; X, X' and X", which may be identical or different, representing an oxygen or sulfur atom, or NR with R representing a hydrogen atom or a $(C_1$—C)alkyl group;

$(O)_2S(O^-)$—, M⁺ with M⁺ representing a hydrogen atom or a cationic counterion (O)CO⁻—, M⁺ with M⁺ as defined previously;

R"—S(O)_2—, with R" representing a hydrogen atom, an alkyl group, or an aryl, (di)$(C_1-C_6)$(alkyl)amino, or aryl$(C_1$—C)(alkyl)amino group; preferentially a phenylamino or phenyl group;

R'''—S(O)_2—X'— with R''' representing a $(C_1-C_6)$ alkyl group or an aryl group which is optionally substituted, X' as defined previously;

(di)$(C_1-C_6)$(alkyl)amino;

aryl$(C_1-C_6)$(alkyl)amino optionally substituted with one or more groups chosen from i) nitro; ii) nitroso; iii) $(O)_2S(O^-)$—, M⁺ and iv) $(C_1-C_6)$alkoxy with M⁺ as defined previously;

optionally substituted heteroaryl; preferentially a benzothiazolyl group;

cycloalkyl; notably cyclohexyl;

Ar—N═N— with Ar representing an optionally substituted aryl group; preferentially a phenyl optionally substituted with one or more alkyl, $(O)_2S(O^-)$, M⁺ or phenylamino groups;

or else two contiguous groups $R_7$ with $R_8$ or $R_8$ with $R_9$ or $R_9$ with $R_{10}$ together form a fused benzo group A';

and R', with R'$_s$ or R'$_s$ with R'$_9$ or R'$_9$ with R'$_{10}$ together form a fused benzo group B'; with A' and B' optionally substituted with one or more groups chosen from i) nitro; ii) nitroso; iii) (O)$_2$S(O$^-$)—, M$^+$; iv) hydroxyl; v) mercapto; vi) (di)(alkyl)amino; vii) R°—C(X)—X'—; viii) R°—X'—C(X)—; ix) R°—X'—C(X)—X"—; x) Ar—N=N— and xi) optionally substituted aryl(C$_1$-C$_6$)(alkyl)amino; with M$_+$, R°, X, X', X" and Ar as defined previously;

W represents a sigma bond σ, an oxygen or sulfur atom, or a divalent group i) —NR— with R as defined previously, or ii) methylene —C(R$_a$)(R$_b$)— with R$_a$ and R$_b$, which may be identical or different, representing a hydrogen atom or an aryl group, or alternatively R$_a$ and R$_b$ together form, with the carbon atom that bears them, a spiro cycloalkyl; preferentially, W represents a sulfur atom or R$_a$ and R$_b$ together form a cyclohexyl; it being understood that formulae (III) and (III') comprise, on one of the rings A, A', B, B' or C:

at least one group (O)$_2$S(O$^-$)—, M'$^+$ with M'$^+$ representing a cationic counterion; or at least one group (O)CO$^-$—, M'$^+$ with M'$^+$ representing a cationic counterion;

preferably at least one sodium sulfonate group.

As examples of dyes of formula (III), mention may be made of: Acid Red 1, Acid Red 4, Acid Red 13, Acid Red 14, Acid Red 18, Acid Red 27, Acid Red 28, Acid Red 32, Acid Red 33, Acid Red 35, Acid Red 37, Acid Red 40, Acid Red 41, Acid Red 42, Acid Red 44, Pigment Red 57, Acid Red 68, Acid Red 73, Acid Red 135, Acid Red 138, Acid Red 184, Food Red 1, Food Red 13, Acid Orange 6, Acid Orange 7, Acid Orange 10, Acid Orange 19, Acid Orange 20, Acid Orange 24, Yellow 6, Acid Yellow 9, Acid Yellow 36, Acid Yellow 199, Food Yellow 3, Acid Violet 7, Acid Violet 14, Acid Blue 113, Acid Blue 117, Acid Black 1, Acid Brown 4, Acid Brown 20, Acid Black 26, Acid Black 52, Food Black 1, Food Black 2, Food Yellow 3 or Sunset Yellow;

and as examples of dyes of formula (III'), mention may be made of: Acid Red 111, Acid Red 134, Acid Yellow 38;

b) the pyrazolone anionic azo dyes of formula (IV) or (IV'):

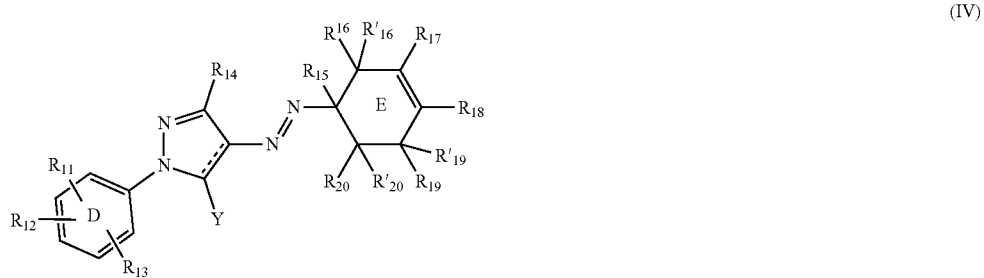

(IV)

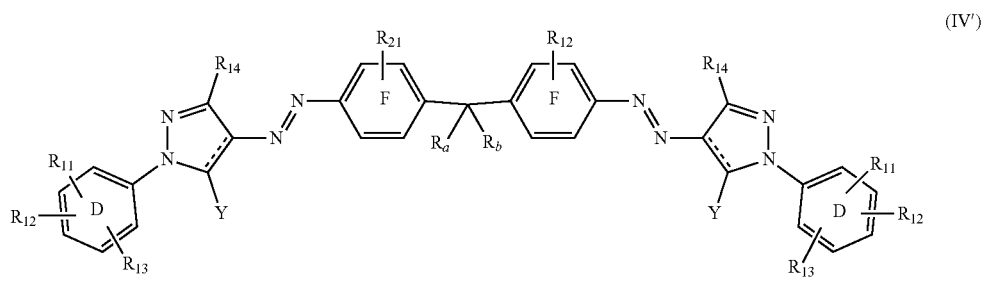

(IV')

in which formulae (IV) and (IV'):

R$_{11}$, R$_{12}$ and R$_{13}$, which may be identical or different, represent a hydrogen or halogen atom, a (C$_1$-C$_6$) alkyl group or —(O)$_2$S(O$^-$), M$^+$ with M$^+$ as defined previously;

R$_{14}$ represents a hydrogen atom, a (C$_1$-C$_6$)alkyl group or a —C(O)O—, M$^+$ group with M$^+$ as defined previously;

R$_{15}$ represents a hydrogen atom;

R$_{16}$ represents an oxo group, in which case R'$_{16}$ is absent, or else R$_{15}$ with R$_{16}$ together form a double bond;

R$_{17}$ and R$_{18}$, which may be identical or different, represent a hydrogen atom or a group chosen from:

(O)$_2$S(O$^-$)—, M$^+$ with M$^+$ as defined previously;

Ar—O—S(O)$_2$— with Ar representing an optionally substituted aryl group; preferentially a phenyl optionally substituted with one or more alkyl groups;

R$_{19}$ and R$_{20}$ together form either a double bond or a benzo group D', which is optionally substituted;

R'$_{16}$, R'$_{19}$ and R'$_{20}$, which may be identical or different, represent a hydrogen atom or a (C$_1$-C$_6$)alkyl group, or a hydroxyl group;

R$_{21}$ represents a hydrogen atom or a (C$_1$-C$_6$)alkyl or (C$_1$-C$_6$)alkoxy group;

R$_a$ and R$_b$, which may be identical or different, are as defined previously; preferentially, R$_a$ represents a hydrogen atom and R$_b$ represents an aryl group such as phenyl;

Y represents either a hydroxyl group or an oxo group;

- - - - represents a single bond when Y is an oxo group; and represents a double bond when Y represents a hydroxyl group;

it being understood that formulae (IV) and (IV') comprise, on one of the rings D or E:

at least one group (O)$_2$S(O$^-$)—, M'$^+$ with M'$^+$ representing a cationic counterion; or at least one group (O)CO$^-$—, M'$^+$ with M'$^+$ representing a cationic counterion;

preferably at least one sodium sulfonate group.

As examples of dyes of formula (IV), mention may be made of: Acid Red 195, Acid Yellow 23, Acid Yellow 27, Acid Yellow 76, and as examples of dyes of formula (IV'), mention may be made of: Acid Yellow 17;

c) the anthraquinone dyes of formula (V) or (V'):

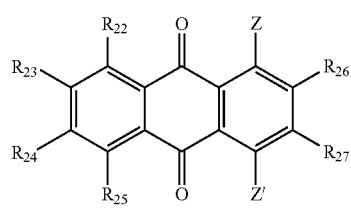

(V)

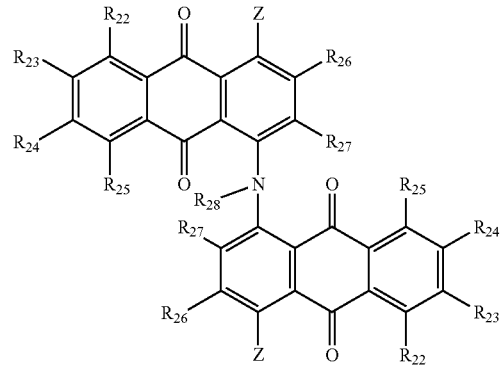

(V')

in which formulae (V) and (V'):

R$_{22}$, R$_{23}$, R$_{24}$, R$_{25}$, R$_{26}$ and R$_{27}$, which may be identical or different, represent a hydrogen or halogen atom, or a group chosen from:

(C$_1$-C$_6$)alkyl;

hydroxyl, mercapto;

(C$_1$-C$_6$)alkoxy, (C$_1$-C$_6$)alkylthio;

optionally substituted aryloxy or arylthio, preferentially substituted with one or more groups chosen from alkyl and (O)$_2$S(O$^-$)—, M$^+$ with M$^+$ as defined previously;

aryl(C$_1$-C$_6$)(alkyl)amino optionally substituted with one or more groups chosen from alkyl and (O)$_2$S(O$^-$)—, M$^+$ with M$^+$ as defined previously;

(di)(C$_1$-C$_6$)(alkyl)amino;

(di)(hydroxy)(C$_1$-C$_6$)(alkyl)amino;

(O)$_2$S(O$^-$)—, M$^+$ with M$^+$ as defined previously;

Z' represents a hydrogen atom or a group NR$_{28}$R$_{29}$ with R$_{28}$ and R$_{29}$, which may be identical or different, representing a hydrogen atom or a group chosen from:

(C$_1$-C$_6$)alkyl;

polyhydroxy(C$_1$-C$_6$)alkyl such as hydroxyethyl;

aryl optionally substituted with one or more groups, particularly i) (C$_1$-C$_6$)alkyl such as methyl, n-dodecyl, n-butyl; ii) (O)$_2$S(O$^-$)—, M$^+$ with M$^+$ as defined previously; iii) R°—C(X)—X'—, R°—X'—C(X)—, R°—X'—C(X)—X"— with R°, X, X' and X" as defined previously; preferentially R° represents a (C$_1$-C$_6$)alkyl group;

cycloalkyl, notably cyclohexyl;

Z represents a group chosen from hydroxyl and NR'$_{28}$R'$_{29}$ with R'$_{28}$ and R'$_{29}$, which may be identical or different, representing the same atoms or groups as R$_{28}$ and R$_{29}$ as defined previously;

it being understood that formulae (V) and (V') comprise:

at least one group (O)$_2$S(O$^-$)—, M'$^+$ with M'$^+$ representing a cationic counterion; or at least one group (O)CO$^-$—, M'$^+$ with M'$^+$ representing a cationic counterion;

preferably at least one sodium sulfonate group.

As examples of dyes of formula (V), mention may be made of: Acid Blue 25, Acid Blue 43, Acid Blue 62, Acid Blue 78, Acid Blue 129, Acid Blue 138, Acid Blue 140, Acid Blue 251, Acid Green 25, Acid Green 41, Acid Violet 42, Acid Violet 43, Mordant Red 3; EXT Violet No. 2;

and as examples of dyes of formula (V'), mention may be made of: Acid Black 48.

d) the nitro dyes of formula (VI) or (VI'):

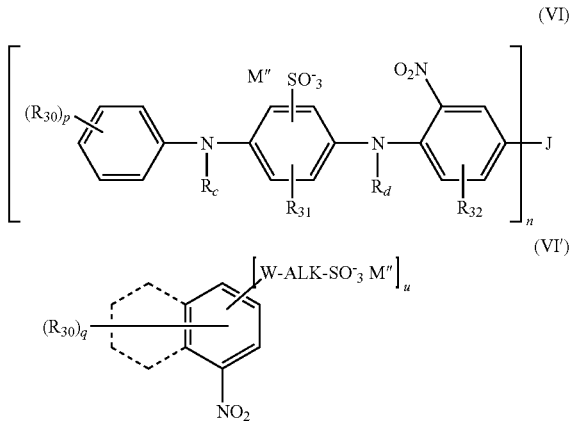

in which formulae (VI) and (VI'):
$R_{30}$, $R_{31}$ and $R_{32}$, which may be identical or different, represent a hydrogen or halogen atom, or a group chosen from:
($C_1$-$C_6$)alkyl;
($C_1$-$C_6$)alkoxy optionally substituted with one or more hydroxyl group(s) or ($C_1$-$C_6$)alkylthio optionally substituted with one or more hydroxyl group(s);
hydroxyl, mercapto;
nitro, nitroso;
polyhalo($C_1$-$C_6$)alkyl;
$R°$—C(X)—X'—, $R°$—X'—C(X)—, $R°$—X'—C(X)—X"— with $R°$, X, X' and X" as defined previously;
$(O)_2S(O^-)$—, $M^+$ with $M^+$ as defined previously;
$(O)CO^-$—, $M^+$ with $M^+$ as defined previously;
(di)($C_1$-$C_6$)(alkyl)amino;
(di)(hydroxy)($C_1$-$C_6$)(alkyl)amino;
heterocycloalkyl such as piperidino, piperazino or morpholino;
in particular, $R_{30}$, $R_{31}$ and $R_{32}$ represent a hydrogen atom;
$R_c$ and $R_d$, which may be identical or different, represent a hydrogen atom or a ($C_1$-$C_6$)alkyl group;
W is as defined previously; W particularly represents an N(H)— group;
ALK represents a linear or branched divalent $C_1$-$C_6$ alkylene group; in particular, ALK represents a —$CH_2$—$CH_2$— group;
n is 1 or 2;
p represents an integer ranging from 1 to 5;
q represents an integer ranging from 1 to 4;
u is 0 or 1;
when n is 1, J represents a nitro or nitroso group; particularly nitro;
when n is 2, J represents an oxygen or sulfur atom, or a divalent group —$S(O)_m$— with m representing an integer 1 or 2; preferentially, J represents an —$SO_2$— group;
M" represents a hydrogen atom or a cationic counterion;

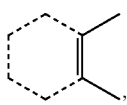

which may be present or absent, represents a benzo group optionally substituted with one or more groups $R_{30}$ as defined previously;
it being understood that formulae (VI) and (VI') comprise:
at least one group $(O)_2S(O^-)$—, $M'^+$ with $M'^+$ representing a cationic counterion; or
at least one group $(O)CO^-$—, $M'^+$ with $M'^+$ representing a cationic counterion;
preferably at least one sodium sulfonate group.
As examples of dyes of formula (VI), mention may be made of: Acid Brown 13 and Acid Orange 3; as examples of dyes of formula (VI'), mention may be made of: Acid Yellow 1, the sodium salt of 2,4-dinitro-1-naphthol-7-sulfonic acid, 2-piperidino-5-nitrobenzenesulfonic acid, 2-(4'-N,N-(2"-hydroxyethyl)amino-2'-nitro)anilineethanesulfonic acid, 4-β-hydroxyethylamino-3-nitrobenzenesulfonic acid; EXT D&C Yellow 7.
e) the triarylmethane dyes of formula (VII):

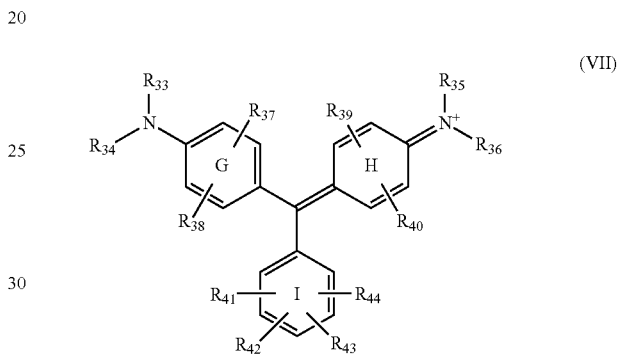

in which formula (VII):
$R_{33}$, $R_{34}$, $R_{35}$ and $R_{36}$, which may be identical or different, represent a hydrogen atom or a group chosen from ($C_1$-$C_6$)alkyl, optionally substituted aryl and optionally substituted aryl($C_1$-$C_6$)alkyl; particularly a ($C_1$-$C_6$)alkyl group and benzyl optionally substituted with an $(O)_mS(O^-)$—, $M^+$ group with $M^+$ and m as defined previously;
$R_{37}$, $R_{38}$, $R_{39}$, $R_{40}$, $R_{41}$, $R_{42}$, $R_{43}$ and $R_{44}$, which may be identical or different, represent a hydrogen atom or a group chosen from:
($C_1$-$C_6$)alkyl;
($C_1$-$C_6$)alkoxy, ($C_1$-$C_6$)alkylthio;
(di)($C_1$-$C_6$)(alkyl)amino;
hydroxyl, mercapto;
nitro, nitroso;
$R°$—C(X)—X'—, $R°$—X'—C(X)—, $R°$—X'—C(X)—X"— with $R°$ representing a hydrogen atom or an alkyl or aryl group; X, X' and X", which may be identical or different, representing an oxygen or sulfur atom, or NR with R representing a hydrogen atom or a ($C_1$-$C_6$)alkyl group;
$(O)_2S(O^-)$—, $M^+$ with $M^+$ representing a hydrogen atom or a cationic counterion;
$(O)CO^-$—, $M^+$ with $M^+$ as defined previously;
or else two contiguous groups $R_{41}$ with $R_{42}$ or $R_{42}$ with $R_{43}$ or $R_{43}$ with $R_{44}$ together form a fused benzo group optionally substituted with one or more groups chosen from i) nitro;
ii) nitroso; iii) $(O)_2S(O^-)$—, $M^+$; iv) hydroxyl; v) mercapto; vi) (di)($C_1$-$C_6$)(alkyl)amino; vii) $R°$—C(X)—X'—; viii) $R°$—X'—C(X)—; ix) $R°$—X'—C(X)—X"—; with $M^+$, $R°$, X, X' and X" as defined previously;

particularly, $R_{37}$ to $R_{40}$ represent a hydrogen atom, and $R_{41}$ to $R_{44}$, which may be identical or different, represent a hydroxyl group or $(O)_2S(O^-)$—, $M^+$ with $M^+$ as defined previously; and when $R_{43}$ with $R_{44}$ together form a benzo group, it is preferentially substituted with an $(O)_2S(O^-)$— group;

it being understood that at least one of the rings G, H or I comprises:
at least one group $(O)_2S(O^-)$—, $M'^+$ with $M'^+$ representing a cationic counterion; or
at least one group $(O)CO^-$—, $M'^+$ with $M'^+$ representing a cationic counterion;
preferably at least one sodium sulfonate group.

As examples of dyes of formula (VII), mention may be made of: Acid Blue 1; Acid Blue 3; Acid Blue 7, Acid Blue 9; Acid Violet 49; Acid Green 3; Acid Green 5 and Acid Green 50.

f) the xanthene-based dyes of formula (VIII):

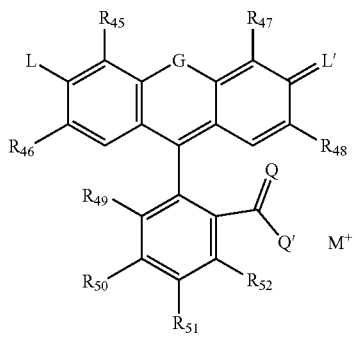

(VIII)

in which formula (VIII):
$R_{45}$, $R_{46}$, $R_{47}$ and $R_{48}$, which may be identical or different, represent a hydrogen atom or a halogen atom;
$R_{49}$, $R_{50}$, $R_{51}$ and $R_{52}$, which may be identical or different, represent a hydrogen or halogen atom, or a group chosen from:
$(C_1-C_6)$alkyl;
$(C_1-C_6)$alkoxy, $(C_1-C_6)$alkylthio;
hydroxyl, mercapto;
nitro, nitroso;
$(O)_2S(O^-)$—, $M^+$ with $M^+$ representing a hydrogen atom or a cationic counterion;
$(O)CO^-$—, $M^+$ with $M^+$ as defined previously;
particularly, $R_{53}$, $R_{54}$, $R_{55}$ and $R_{48}$ represent a hydrogen or halogen atom;
G represents an oxygen or sulfur atom or a group $NR_c$ with $R_c$ as defined previously; particularly, G represents an oxygen atom;
L represents an alkoxide $O^-$, $M^+$; a thioalkoxide $S^-$, $M^+$ or a group $NR_f$, with $R_f$ representing a hydrogen atom or a $(C_1-C_6)$alkyl group, and $M^+$ as defined previously; $M^+$ is particularly sodium or potassium;
L' represents an oxygen or sulfur atom or an ammonium group: $N^+R_f R_g$, with $R_f$ and $R_g$, which may be identical or different, representing a hydrogen atom, a $(C_1-C_6)$alkyl group or an optionally substituted aryl group; L' particularly represents an oxygen atom or a phenylamino group optionally substituted with one or more alkyl or $(O)_m S(O^-)$—, $M^+$ group(s) with m and $M^+$ as defined previously;

Q and Q', which may be identical or different, represent an oxygen or sulfur atom; particularly Q and Q' represent an oxygen atom;
$M^+$ is as defined previously.

As examples of dyes of formula (VIII), mention may be made of: Acid Yellow 73; Acid Red 51; Acid Red 52; Acid Red 87; Acid Red 92; Acid Red 95; Acid Violet 9.

g) the indole-based dyes of formula (IX):

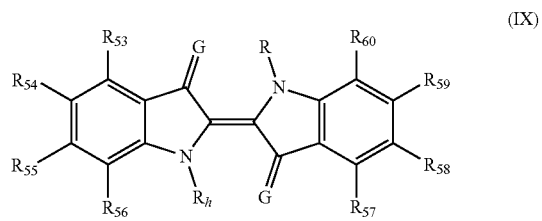

in which formula (IX):
$R_{53}$, $R_{54}$, $R_{55}$, $R_{56}$, $R_{57}$, $R_{58}$, $R_{59}$ and $R_{60}$, which may be identical or different, represent a hydrogen atom or a group chosen from:
$(C_1-C_6)$alkyl;
$(C_1-C_6)$alkoxy, $(C_1-C_6)$alkylthio;
hydroxyl, mercapto;
nitro, nitroso;
$R°$—C(X)—X'—, $R°$—X'—C(X)—, $R°$—X'—C(X)—X"— with $R°$ representing a hydrogen atom or an alkyl or aryl group; X, X' and X", which may be identical or different, representing an oxygen or sulfur atom, or NR with R representing a hydrogen atom or a $(C_1-C_6)$alkyl group;
$(O)_2S(O^-)$—, $M^+$ with $M^+$ representing a hydrogen atom or a cationic counterion;
$(O)CO^-$—, $M^+$ with $M^+$ as defined previously;
G represents an oxygen or sulfur atom or a group $NR_c$ with $R_c$ as defined previously; particularly, G represents an oxygen atom;
$R_i$ and $R_h$, which may be identical or different, represent a hydrogen atom or a $(C_1-C_6)$alkyl group;
it being understood that formula (IX) comprises:
at least one group $(O)_2S(O^-)$—, $M'^+$ with $M'^+$ representing a cationic counterion; or
at least one group $(O)CO^-$—, $M'^+$ with $M'^+$ representing a cationic counterion;
preferably at least one sodium sulfonate group.

As examples of dyes of formula (IX), mention may be made of: Acid Blue 74.

h) the quinoline-based dyes of formula (X):

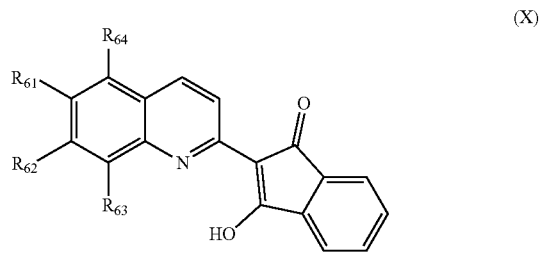

in which formula (X):
R$_{61}$ represents a hydrogen or halogen atom or a (C$_1$-C$_6$)alkyl group;
R$_{62}$, R$_{63}$ and R$_{64}$, which may be identical or different, represent a hydrogen atom or a group (O)$_2$S(O$^-$)—, M$^+$ with M$^+$ representing a hydrogen atom or a cationic counterion; or else R$_{61}$ with R$_{62}$, or R$_{61}$ with R$_{64}$, together form a benzo group optionally substituted with one or more groups (O)$_2$S(O$^-$)—, M$^+$ with M$^+$ representing a hydrogen atom or a cationic counterion;
it being understood that formula (X) comprises at least one group (O)$_2$S(O$^-$)—, M'$^+$ with M'$^+$ representing a cationic counterion, preferably at least one sodium sulfonate group.

As examples of dyes of formula (X), mention may be made of: Acid Yellow 2, Acid Yellow 3 and Acid Yellow 5.

More particularly, the dyes of formulae (III) to (VIII) that are useful in the invention are chosen from: Acid Red 87 (VIII) (C.I. 45380); sodium salt of 2,4-dinitro-1-naphthol-7-sulfonic acid (VI') (C.I. 10316); Acid Orange 3 (VI) (C.I. 10383); Acid Yellow 9/Food Yellow 2 (III) (C.I. 13015); Direct Red 45/Food Red 13 (III) (C.I. 14780); Acid Black 52 (III) (C.I. 13711); Acid Yellow 36 (III) (C.I. 13065); sodium salt of 1-hydroxy-2-(2',4'-xylyl-5-sulfonatoazo)naphthalene-4-sulfonic acid/Food Red 1(III) (C.I. 14700); Acid Red 14/Food Red 3/Mordant Blue 79 (III) (C.I. 14720); sodium salt of 4-hydroxy-3-[(2-methoxy-5-nitrophenyl)diaza]-6-(phenylamino)naphthalene-2-sulfonic acid/Acid Brown 4 (III) (C. I. 14805); Acid Orange 7/Pigment Orange 17/Solvent Orange 49 (III) (C.I. 15510); Food Yellow 3/Pigment Yellow 104 (III) (C.I. 15985); Acid Red 27/Food Red 9 (III) (C.I. 16185); Acid Orange 10/Food Orange 4 (III) (C.I. 16230); Acid Red 44 (III) (C.I. 16250); Acid Red 33/Food Red 12 (III) (C.I. 17200); Acid Red 184 (III) (C.I. 15685); Acid Violet 3 (III) (C.I. 19125); sodium salt of 1-hydroxy-2-(4'-acetamidophenylazo)-8-acetamidonaphthalene-3,6-disulfonic acid/Acid Violet 7/Food Red 11 (III) (C.I. 18055); Acid Red 135 (III) (C.I. 18130); Acid Yellow 27 (IV) (C.I. 19130); Acid Yellow 23/Food Yellow 4 (IV) (C.I. 19140); 4'-(sulfonato-2",4"-dimethyl)bis(2,6-phenylazo)-1,3-dihydroxybenzene/Acid Orange 24 (III) (C.I. 20170); sodium salt of 1-amino-2-(4'-nitrophenylazo)-7-phenylazo-8-hydroxynaphthalene-3,6-disulfonic acid/Acid Black 1 (III) (C.I. 20470); (4-((4-methylphenyl)sulfonyloxy)phenylazo)-2,2'-dimethyl-4-((2-hydroxy-5,8-disulfonato)naphthylazo) biphenyl/Acid Red 111 (III') (C.I. 23266); Food Black 2 (III) (C.I. 27755); 1-(4'-sulfonatophenylazo)-4-((2"-hydroxy-3"-acetylamino-6",8"-disulfonato)naphthylazo)-6-sulfonatonaphthalene (tetrasodium salt)/Food Black 1 (III) (C.I. 25440); Acid Blue 9 (VII) (C.I. 42090); Acid Violet 43 (V) (C.I. 60730); Acid Green 25 (V) (C.I. 61570); sodium salt of 1-amino-4-cyclohexylamino-9,10-anthraquinone-2-sulfonic acid/Acid Blue 62 (V) (C.I. 62045); Acid Blue 78 (V) (C.I. 62105); sodium salt of 4-hydroxy-3-((2-methoxyphenyl) azo)-1-naphthalenesulfonic acid/Acid Red 4 (III) (C.I. 14710); 2-piperidino 5-nitrobenzenesulfonic acid (VI'); 2-(4'-N,N(2"-hydroxyethyl)amino-2'-nitro)anilineethanesulfonic acid (VI'); 4-β-hydroxyethylamino-3-nitrobenzenesulfonic acid (VI'); Acid Violet 49 (VII) (C.I. 42640); Acid Blue 7 (VII) (C.I. 42080); sodium salt of 1,2-dihydroxy-3-sulfoanthraquinone/Mordant Red 3 (V) (C.I. 58005); sodium salt of 1-amino-9,10-dihydro-9,10-dioxo-4-(phenylamino) 2-anthracenesulfonic acid/Acid Blue 25 (V) (C.I. 62055); sodium salt of 4-hydroxy-3-((2-methoxyphenyl) azo)-1-naphthalenesulfonic acid/Acid Red 4 (III) (C.I. 14710).

Most of these dyes are described in particular in the Color Index published by The Society of Dyers and Colorists, P.O. Box 244, Perkin House, 82 Grattan Road, Bradford, Yorkshire, BD1 2JB, England.

The anionic dyes that are most particularly preferred are the dyes designated in the Color Index under the code C.I. 58005 (monosodium salt of 1,2-dihydroxy-9,10-anthraquinone-3-sulfonic acid), C.I. 60730 (monosodium salt of 2-[(9,10-dihydro-4-hydroxy-9,10-dioxo-1-anthracenyl)amino]-5-methylbenzenesulfonic acid), C.I. 15510 (monosodium salt of 4-[(2-hydroxy-1-naphthalenyl)azo]benzenesulfonic acid), C.I. 15985 (disodium salt of 6-hydroxy-5-[(4-sulfophenyl)azo]-2-naphthalenesulfonic acid), C.I. 17200 (disodium salt of 5-amino-4-hydroxy-3-(phenylazo)-2,7-naphthalenedisulfonic acid), C.I. 20470 (disodium salt of 1-amino-2-(4'-nitrophenylazo)-7-phenylazo-8-hydroxy-3,6-naphthalenedisulfonic acid), C.I. 42090 (disodium salt of N-ethyl-N-[4-[[4-[ethyl(3-sulfophenyl)methyl]amino]phenyl](2-sulfophenyl)methylene]-2,5-cyclohexadien-1-ylidene]-3-sulfobenzenemethanaminium hydroxide, inner salt), C.I. 61570 (disodium salt of 2,2'-[(9,10-dihydro-9,10-dioxo-1,4-anthracenediyl)diimino]bis[5-methyl]benzenesulfonic acid).

Use may also be made of compounds corresponding to the mesomeric or tautomeric forms of structures (III) to (X).

Natural Dyes

The direct dyes may be chosen from natural direct dyes.

Among the natural direct dyes that may be used according to the invention, mention may be made of lawsone, juglone, alizarin, purpurin, carminic acid, kermesic acid, purpurogallin, protocatechaldehyde, indigo, isatin, curcumin, spinulosin, apigenidin, orceins, brazilin, brazilein, hematin and hematoxylin. Use may also be made of extracts or decoctions containing these natural dyes and notably henna-based poultices or extracts.

According to a preferred embodiment, the direct dyes are chosen from the triarylmethane direct dyes of formulae (IIa$_1$) and (IIa$_2$) below, and mixtures thereof:

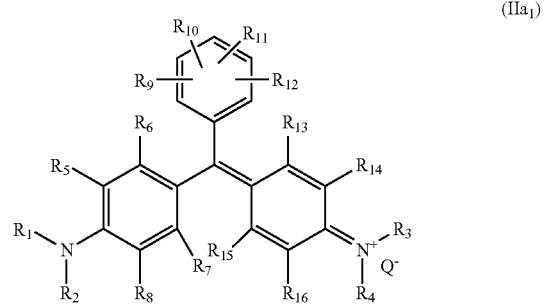

(IIa$_1$)

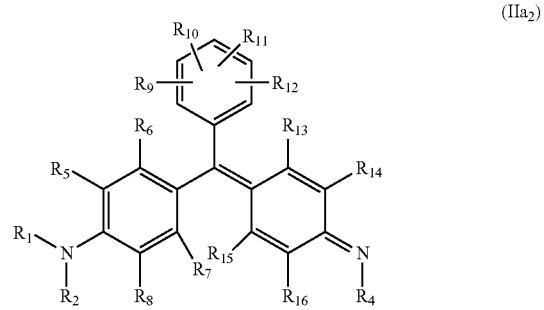

(IIa$_2$)

in which:

$R_1$, $R_2$, $R_3$ and $R_4$, which may be identical or different, represent a hydrogen atom or a group from among: ($C_1$-$C_6$)alkyl which is optionally substituted, preferably with a hydroxyl group; aryl such as phenyl, aryl($C_1$-$C_4$)alkyl such as benzyl, heteroaryl, heteroaryl($C_1$-$C_4$) alkyl, or else two groups $R_1$, and $R_2$, and/or $R_3$ and $R_4$, borne by the same nitrogen atom, form, together with the nitrogen atom which bears them, an optionally substituted heterocycloalkyl group such as morpholino, piperazino or piperidino, preferably $R_1$, $R_2$, $R_3$ and $R_4$, which may be identical or different, represent a hydrogen atom or a ($C_1$-$C_4$)alkyl group;

$R_5$, $R_6$, $R_7$, $R_8$, $R_9$, $R_{10}$, $R_{11}$, $R_{12}$, $R_{13}$, $R_{14}$, $R_{15}$, and $R_{16}$, which may be identical or different, represent a hydrogen or halogen atom, or a group chosen from i) hydroxyl, ii) thiol, iii) amino, iv) (di)($C_1$-$C_4$)(alkyl) amino, v) (di)arylamino such as (di)phenylamino, vi) nitro, vii) acylamino (—NR—C(O)R') in which the radical R is a hydrogen atom, a $C_1$-$C_4$ alkyl radical optionally bearing at least one hydroxyl group and the radical R' is a $C_1$-$C_2$ alkyl radical; viii) carbamoyl (($R$)$_2$N—C(O)-) in which the radicals R, which may be identical or different, represent a hydrogen atom or a $C_1$-$C_4$ alkyl radical optionally bearing at least one hydroxyl group; ix) carboxylic acid or ester, (—O—C(O)R') or (—C(O)OR'), in which the radical R' is a hydrogen atom or $C_1$-$C_4$ alkyl optionally bearing at least one hydroxyl group and the radical R' is a $C_1$-$C_2$ alkyl radical; x) alkyl which is optionally substituted, notably with a hydroxyl group; xi) alkylsulfonylamino (R'$SO_2$—NR—) in which the radical R represents a hydrogen atom or a $C_1$-$C_4$ alkyl radical optionally bearing at least one hydroxyl group and the radical R' represents a $C_1$-$C_4$ alkyl radical or a phenyl radical; xii) aminosulfonyl (($R$)$_2$N—$SO_2$—) in which the radicals R, which may be identical or different, represent a hydrogen atom or a $C_1$-$C_4$ alkyl radical optionally bearing at least one hydroxyl group; xiii) ($C_1$-$C_4$) alkoxy; and xiv) ($C_1$-$C_4$)alkylthio;

or else two radicals borne by two contiguous carbon atoms $R_5$ and $R_6$ and/or $R_7$ and $R_8$, and/or $R_9$ and $R_{10}$ and/or $R_{11}$ and $R_{12}$ and/or $R_{13}$ and $R_{14}$ and/or $R_{15}$ and $R_{16}$ form, together with the carbon atoms which bear them, an aryl or heteroaryl, preferably benzo, 6-membered fused ring, said ring possibly also being optionally substituted, preferably an unsubstituted benzo ring;

$Q^-$ represents an anionic counterion for achieving electrical neutrality, preferably chosen from halides such as chloride or bromide, and phosphate.

Preferably, the direct dye(s) are chosen from neutral and cationic direct dyes, and mixtures thereof.

More preferentially, the direct dye(s) are preferably chosen from Basic Red 51, HC Blue 15, and mixtures thereof.

The direct dye(s) may be present in the composition in a total content ranging from 0.001% to 5% by weight, preferably from 0.01% to 3% by weight, more preferentially from 0.1% to 0.1% by weight, even more preferentially from 0.1% to 0.5% by weight, relative to the total weight of the composition.

Additional Basifying Agents

The composition may also comprise one or more additional basifying agents other than the carbonates, bicarbonates and silicates as defined previously.

According to a preferred embodiment, the composition according to the invention does not comprise any additional basifying agent chosen from aqueous ammonia and/or alkanolamines.

Acidifying Agents

The composition may also comprise one or more acidifying agents.

pH of the Composition

The composition according to the invention preferably has a pH of less than or equal to 11, preferably less than or equal to 10.5, preferably less than or equal to 10.

The pH of the composition according to the invention may range be from 8 to 11, preferably from 8 to 10.5, more preferentially from 8 to 10.

According to a particularly preferred embodiment, the pH of the composition according to the invention ranges from 8.3 to 10.

Other Characteristics of the Composition

The composition preferably comprises water in a content ranging from 5% to 99% by weight, more preferentially ranging from 5% to 80% by weight, relative to the total weight of the composition.

The composition may also comprise at least one organic solvent.

The term "organic solvent" means an organic substance that is capable of dissolving another substance without chemically modifying it.

The composition according to the invention may be in liquid form, in the form of a serum, in thickened form, in particular a gel, a cream, a wax or a paste, or in foam form.

The composition according to the invention may also comprise one or more additional compounds chosen from nonionic, anionic, cationic or amphoteric surfactants, cationic, anionic, nonionic or zwitterionic, associative or non-associative thickening polymers of natural or synthetic origin, silicones in the form of oil, gums or resins or non-silicone plant, mineral or synthetic oils, UV-screening agents, fillers, such as nacres and metal oxides such as titanium dioxides, clays, fragrances, peptizers, vitamins and preserving agents.

Process for the Simultaneous Bleaching and Dyeing of Keratin Fibres

According to a second aspect, a subject of the present invention is a process for the simultaneous bleaching and dyeing of keratin fibres, comprising the application to the keratin fibres of a composition as defined previously.

In particular, the composition is applied to wet or dry keratin fibres.

Preferably, the keratin fibres are dark keratin fibres.

The term "dark keratin fibres" means keratin fibres with a tone depth of less than or equal to 6 (dark blond) and preferably less than or equal to 4 (chestnut-brown).

The "tone depth" is the unit known to hairstyling professionals, published in the book *Sciences des traitements capillaires* [Hair treatment sciences] by Charles Zviak, 1988, published by Masson, pages 215 and 278; the tone depths range, according to the European scale, from 1 (black) to 10 (very light blond), one unit corresponding to one tone; the higher the FIGURE, the lighter the shade.

The composition may advantageously be applied to the keratin fibres in an amount ranging from 0.1 g to 20 g of composition per gram of keratin fibres.

The composition is left to stand on the fibres for a period generally from 1 minute to 1 hour, preferably from 5 minutes to 60 minutes.

By way of example, the composition may be left to stand on the fibres for a period of 50 minutes.

The composition may be left to stand on the fibres under an occlusive system. A non-limiting example of an occlusive system that may be mentioned is an occlusive system of envelope type made of aluminium or plastic film or a hair cap with or without holes.

The temperature during the simultaneous bleaching and dyeing process is conventionally between room temperature (between 15° C. and 25° C.) and 80° C. and preferably between room temperature and 60° C.

By way of example, the temperature during the simultaneous bleaching and dyeing process is 33° C.

After the treatment, the keratin fibres are optionally rinsed with water, optionally washed with a shampoo and then rinsed with water, before being dried or left to dry naturally.

The drying step may be performed using absorbent paper, a hairdryer or a styling hood.

The composition according to the invention is preferably prepared by mixing at least two compositions. Preferably, the mixing of said at least two compositions is performed extemporaneously, before application of the composition according to the invention to the keratin fibres.

According to a preferred embodiment, the composition according to the invention results from the mixing of two compositions (A) and (B1):
   a composition (A) comprising i) one or more chemical oxidizing agents chosen from hydrogen peroxide, hydrogen peroxide-generating systems other than peroxygenated salts, and mixtures thereof as defined previously; and
   a composition (B1) comprising:
   ii) one or more compounds chosen from carbonates, carbonate-generating systems, bicarbonates, bicarbonate-generating systems and mixtures thereof as defined previously; and
      iii) one or more silicates as defined previously; and
      iv) one or more oxidation dyes as defined previously;
   or a mixture of three compositions (A), (B2) and (C):
      a composition (A) comprising i) one or more chemical oxidizing agents chosen from hydrogen peroxide, hydrogen peroxide-generating systems other than peroxygenated salts, and mixtures thereof as defined previously; and
      a composition (B2) comprising:
   ii) one or more compounds chosen from carbonates, carbonate-generating systems, bicarbonates, bicarbonate-generating systems and mixtures thereof as defined previously; and
      iii) one or more silicates as defined previously; and
      a composition (C) comprising iv) one or more oxidation dyes as defined previously.

Preferably, at least one of the compositions (A) or (B1) or at least one of the three compositions (A) or (B2) or (C) is aqueous. More preferentially, composition (A) is aqueous.

According to a particular embodiment, composition (B1) or (B2) is anhydrous.

The term "aqueous composition" means a composition comprising at least 5% by weight of water. Preferably, an aqueous composition comprises more than 10% by weight of water and even more advantageously more than 20% by weight of water.

According to a more preferred embodiment, the composition according to the invention results from the mixing of two compositions (A') and (B1'):
   a composition (A') comprising i) hydrogen peroxide; and
   a composition (B1') comprising:
   ii) one or more compounds chosen from carbonates, bicarbonates and mixtures thereof as defined previously; and
      iii) one or more silicates as defined previously; and
      iv) one or more oxidation dyes as defined previously;
   or a mixture of three compositions (A'), (B2') and (C'):
      a composition (A') comprising i) hydrogen peroxide; and
      a composition (B2') comprising:
   ii) one or more compounds chosen from carbonates, bicarbonates and mixtures thereof as defined previously; and
      iii) one or more silicates as defined previously; and
      a composition (C') comprising iv) one or more oxidation dyes as defined previously.

Preferably, at least one of the compositions (A') or (B1') or at least one of the three compositions (A') or (B2') or (C') is aqueous. More preferentially, composition (A') is aqueous.

According to a particular embodiment, composition (B1') or (B2') is anhydrous.

Use

According to a third aspect, a subject of the present invention is the use of the composition as defined previously for the simultaneous bleaching and dyeing of keratin fibres.

Multi-Compartment Device (Kit)

According to a fourth aspect, a subject of the present invention is a multi-compartment device (kit) comprising:
   a first compartment containing a composition (A) as defined previously; and
   a second compartment containing a composition (B1) as defined previously;
   or
   a first compartment containing a composition (A) as defined previously; and
   a second compartment containing a composition (B2) as defined previously; and
   a third compartment containing a composition (C) as defined previously.

Preferably, the multi-compartment device comprises:
   a first compartment containing a composition (A') as defined previously; and
   a second compartment containing a composition (B1') as defined previously;
   or
   a first compartment containing a composition (A') as defined previously; and
   a second compartment containing a composition (B2') as defined previously; and
   a third compartment containing a composition (C') as defined previously.

EXAMPLES

The examples that follow allow the invention to be understood more clearly, without, however, being limiting in nature. In the examples that follow, unless otherwise indicated, all the amounts are shown as mass percentages relative to the total weight of the composition.

Example 1

The following compositions were prepared and then applied according to the application protocol described below:

TABLE 1

| Ingredients | C1 | C2 | C3 | C4 |
| --- | --- | --- | --- | --- |
| Oxidizing cream Blond Studio 40 Vol. L'Oréal Professionnel (12% of $H_2O_2$) | 60.0 (i.e. 7.2% of $H_2O_2$) | 60.0 (i.e. 7.2% of $H_2O_2$) | 60.0 (i.e. 7.2% of $H_2O_2$) | 60.0 (i.e. 7.2% of $H_2O_2$) |
| Sodium silicate (CAS: 1344-09-8) | 13.30 | 13.30 | 13.30 | 13.30 |
| Sodium metasilicate (CAS: 6834-92-0) | 0.33 | 0.33 | 0.33 | 0.33 |
| Ammonium bicarbonate | 13.30 | 13.30 | 13.30 | 13.30 |
| Toluene-2,5-diamine | 0.025 | 0.027 | 0.032 | 0.023 |
| 2-Methyl-5-hydroxyethylaminophenol | 0.025 | — | — | — |
| 3-Amino-2-chloro-6-methylphenol | — | 0.023 | — | — |
| 2-Amino-3-hydroxypyridine | — | — | 0.018 | — |
| 2,4-Diaminophenoxyethanol hydrochloride | — | — | — | 0.027 |
| Water | qs 100 | qs 100 | qs 100 | qs 100 |

TABLE 2

| Ingredients | C5 | C6 | C7 | C8 |
| --- | --- | --- | --- | --- |
| Oxidizing cream Blond Studio 40 Vol. L'Oréal Professionnel (12% of $H_2O_2$) | 60.0 (i.e. 7.2% of $H_2O_2$) | 60.0 (i.e. 7.2% of $H_2O_2$) | 60.0 (i.e. 7.2% of $H_2O_2$) | 60.0 (i.e. 7.2% of $H_2O_2$) |
| Sodium silicate (CAS: 1344-09-8) | 13.30 | 13.30 | 13.30 | 13.30 |
| Sodium metasilicate (CAS: 6834-92-0) | 0.33 | 0.33 | 0.33 | 0.33 |
| Ammonium bicarbonate | 13.30 | 13.30 | 13.30 | 13.30 |
| 1-Hydroxyethyl-4,5-diaminopyrazole sulfate | 0.027 | 0.026 | — | — |
| 2,3-Diaminodihydropyrazolo Pyrazolone Dimethosulfonate | — | — | — | 0.030 |
| Dimethylpiperazinium aminopyrazolopyridine hydrochloride | — | — | 0.031 | — |
| 3-Amino-2-chloro-6-methylphenol | 0.023 | — | 0.019 | — |
| 2,4-Diaminophenoxyethanol hydrochloride | — | 0.024 | — | 0.020 |
| Water | qs 100 | qs 100 | qs 100 | qs 100 |

Application Protocol 10 g of each of the compositions $C_1$ to $C_8$ are applied to 8 locks of 1 g of Caucasian HT4 dark hair on a hot plate maintained at a temperature of 33° C. The whole is covered with a cellophane film for 50 minutes.

The locks are then rinsed, washed with a standard shampoo, rinsed again and then dried.

Results:

TABLE 3

| Composition | Hair colour observed |
| --- | --- |
| C1 | Light grey |
| C2 | Pale violet |
| C3 | Light brown |
| C4 | Turquoise blue |
| C5 | Salmon pink |
| C6 | Plum |
| C7 | Pale blue-grey |
| C8 | Slightly salmony beige |

The compositions according to the invention make it possible to simultaneously bleach and dye dark hair in a single step and allow pastel colours to be obtained.

The invention claimed is:
1. A composition, comprising:
   i) from 3.5% to 8.5% of at least one chemical oxidizing agent chosen from hydrogen peroxide, hydrogen per- oxide-generating system(s) other than peroxygenated salts, or mixtures of two or more thereof;
ii) from 7% to 20% of at least one compound chosen from carbonate(s), carbonate-generating system(s), bicarbonate(s), bicarbonate-generating system(s), or mixtures of two or more thereof;
iii) from 4% to 20% of at least one silicate; and
iv) at least one oxidation dye;
wherein all amounts are by weight, relative to the total weight of the composition, and
wherein the composition is a dyeing composition for simultaneously bleaching and dyeing hair.

2. The composition of claim 1, wherein the at least one chemical oxidizing agent is chosen from hydrogen peroxide.

3. The composition of claim 1, wherein the at least one compound chosen from carbonates, carbonate-generating systems, bicarbonates, bicarbonate-generating systems, or mixtures of two or more thereof is chosen from carbonate(s), carbonate-generating system(s), or mixtures of two or more thereof.

4. The composition of claim 3, wherein the carbonate(s) is chosen from:
alkali metal carbonate(s);
alkaline-earth metal carbonate(s);
lanthanide carbonate(s);
transition metal carbonate(s);
bismuth carbonate;
cadmium carbonate;
thallium carbonate;
zinc carbonate;
compounds of formula $(N^+R^1R^2R^3R^4)_2CO_3^{2-}$, wherein $R^1$, $R^2$, $R^3$, and $R^4$ are independently chosen from a hydrogen atom or a $(C_1-C_4)$alkyl group optionally substituted with a hydroxyl group;
guanidine carbonate; or
mixtures of two or more thereof.

5. The composition of claim 1, wherein the at least one compound chosen from carbonates, carbonate-generating systems, bicarbonates, bicarbonate-generating systems, or mixtures of two or more thereof is chosen from bicarbonate(s), bicarbonate-generating system(s), or mixtures of two or more thereof.

6. The composition of claim 5, wherein the bicarbonate(s) are chosen from:
alkali metal bicarbonate(s);
alkaline-earth metal bicarbonate(s);
compounds of formula $N^+R^1R^2R^3R^4HCO_3^-$, wherein $R^1$, $R^2$, $R^3$ and $R^4$ are independently chosen from a hydrogen atom or a $(C_1-C_4)$ alkyl group optionally substituted with a hydroxyl group;
aminoguanidine bicarbonate; or
mixtures of two or more thereof.

7. The composition of claim 1, wherein the at least one silicate is chosen from alkali metal silicates, alkaline-earth metal silicates, aluminum silicates, trimethylammonium silicates, or mixtures of two or more thereof.

8. The composition of claim 5, wherein the weight ratio of the total amount of (bi)carbonate(s), (bi)carbonate-generating system(s), or mixtures of two or more thereof to the total amount of silicate(s) ranges from 0.06 to 100.

9. The composition of claim 5, wherein the weight ratio of the total amount of (bi)carbonate(s) and/or (bi)carbonate-generating system(s), or mixtures of two or more thereof ii) to the total amount of chemical oxidizing agent(s) i) ranges from 0.0008 to 20.

10. The composition of claim 3, wherein the weight ratio of the total amount of carbonate(s) and/or carbonate-generating system(s), or mixtures of two or more thereof to the total amount of bicarbonate(s) and/or bicarbonate-generating system(s), or mixtures of two or more thereof ranges from 0.01 to 100.

11. The composition of claim 1, comprising magnesium carbonate in a total amount ranging from 7% to 15% by weight, relative to the total weight of the composition.

12. The composition of claim 1, comprising persulfates in a total amount of less than 10% by weight, relative to the total weight of the composition.

13. The composition of claim 1, wherein the pH of the composition ranges from 8 to 11.

14. The composition of claim 1, wherein the at least one oxidation dye is chosen from one or more oxidation bases, optionally combined with one or more coupling agents.

15. The composition of claim 1, wherein the total amount of oxidation dye(s) iv) ranges from 0.001% to 5% by weight, relative to the total weight of the composition.

16. A method for simultaneously bleaching and dyeing hair comprising:
(1) forming a mixture by:
(a) mixing a composition (A) and a composition (B1), or
(b) mixing the composition (A), a composition (B2), and a composition (C), wherein composition (A) comprises:
i) from 3.5% to 8.5% of at least one chemical oxidizing agent chosen from hydrogen peroxide, hydrogen peroxide-generating systems other than peroxygenated salts, or mixtures of two or more thereof; and
wherein composition (B1) comprises:
ii) from 7% to 20% of at least one compound chosen from carbonates, carbonate-generating systems, bicarbonates, bicarbonate-generating systems, or mixtures of two or more thereof;
iii) from 4% to 20% of at least one silicate; and
iv) at least one oxidation dye;
wherein composition (B2) comprises:
ii) at least one compound chosen from carbonates, carbonate-generating systems, bicarbonates, bicarbonate-generating systems, or mixtures of two or more thereof; and
iii) at least one silicate; and
wherein composition (C) comprises iv) at least one oxidation dye, and
(2) applying the mixture to the hair.

17. A kit for simultaneously bleaching and dyeing hair, comprising:
a first compartment comprising a composition (A) comprising:
i) from 3.5% to 8.5% of at least one chemical oxidizing agent chosen from hydrogen peroxide, hydrogen peroxide-generating systems other than peroxygenated salts, or mixtures of two or more thereof; and
a second compartment comprising a composition (B) comprising:
ii) from 7% to 20% of at least one compound chosen from carbonates, carbonate-generating systems, bicarbonates, bicarbonate-generating systems, or mixtures of two or more thereof;
iii) from 4% to 20% of at least one silicate; and
iv) optionally at least one oxidation dye; and
wherein the kit optionally comprises a composition (C) comprising iv) at least one oxidation dye.

18. The method according to claim 16, wherein the total amount of oxidation dye(s) iv) ranges from 0.001% to 5% by weight, relative to the total weight of the composition.

19. The method according to claim 16, wherein the mixture comprises from 7% to 15% of compounds chosen from carbonate(s), carbonate-generating system(s), bicarbonate(s), bicarbonate-generating system(s), or mixtures thereof.

20. The method according to claim 16, wherein the at least one oxidation dye iv) is chosen from one or more oxidation bases, optionally combined with one or more coupling agents.

* * * * *